(12) United States Patent
Scott et al.

(10) Patent No.: US 8,521,633 B2
(45) Date of Patent: Aug. 27, 2013

(54) CREATING AND MAINTAINING A PAYOUT-READY PORTFOLIO WITHIN AN INVESTMENT PLAN TO GENERATE A SUSTAINABLE INCOME STREAM

(75) Inventors: Jason S. Scott, Los Altos, CA (US); Shinichiro Inoue, Redwood City, CA (US); Jeffrey N. Maggioncalda, Palo Alto, CA (US); David Ramirez, Oakland, CA (US); Wei-Yin Hu, Menlo Park, CA (US); John G. Watson, Menlo Park, CA (US); David Boudreau, Point Richmond, CA (US); Gregory Stein, San Mateo, CA (US); James W. Shearer, San Francisco, CA (US)

(73) Assignee: Financial Engines, Inc., Sunnyvale, CA (US)

( * ) Notice: Subject to any disclaimer, the term of this patent is extended or adjusted under 35 U.S.C. 154(b) by 0 days.

(21) Appl. No.: 13/245,807

(22) Filed: Sep. 26, 2011

(65) Prior Publication Data
US 2012/0185408 A1   Jul. 19, 2012

Related U.S. Application Data

(63) Continuation of application No. 13/195,447, filed on Aug. 1, 2011, now abandoned.

(60) Provisional application No. 61/434,006, filed on Jan. 19, 2011.

(51) Int. Cl.
*G06Q 40/00* (2012.01)

(52) U.S. Cl.
USPC .......................................................... 705/36 R

(58) Field of Classification Search
USPC ....................................................... 705/35–45
See application file for complete search history.

(56) References Cited

U.S. PATENT DOCUMENTS

| 5,933,815 | A | 8/1999 | Golden |
| 7,120,601 | B2 | 10/2006 | Chen et al. |

(Continued)

FOREIGN PATENT DOCUMENTS

WO     2004081748     9/2004

OTHER PUBLICATIONS

McCormack et al., "The Synthetic Term-Certain Annuity". Journal of Financial Planning; Feb. 2009; v.22 No. 2; pp. 38-45. ABI/INFORM Global.

(Continued)

*Primary Examiner* — Richard C Weisberger
(74) *Attorney, Agent, or Firm* — Hamilton, DeSanctis & Cha LLP

(57) ABSTRACT

Financial advisory methods and systems for creating a steady lifetime income stream within an investment plan is provided. According to one embodiment, based on an investor's current holdings in the investment plan, a pattern of periodic cash payouts is identified that can be made to the investor from an in-plan payout program implemented with the limited universe of financial products available within the investment plan. The assets of the investment plan are rebalanced to form a payout portfolio and an equity exposure portfolio. The payout portfolio is constructed to create an annuity-like stream of income to support the pattern of periodic cash payouts and includes multiple bond funds. The equity exposure portfolio is constructed to address inflation risk by providing an ability to rise with equities markets. Finally, a periodic cash payout of the pattern of periodic cash payouts is caused to be paid to the investor from the investment plan.

30 Claims, 21 Drawing Sheets

(56) References Cited

U.S. PATENT DOCUMENTS

| | | |
|---|---|---|
| 7,127,423 B2 | 10/2006 | Dunning et al. |
| 7,249,077 B2 | 7/2007 | Williams et al. |
| 7,398,241 B2 | 7/2008 | Fay et al. |
| 7,647,261 B2 | 1/2010 | Merton et al. |
| 7,664,700 B1 | 2/2010 | Fisher, III |
| 7,685,065 B2 | 3/2010 | Weiss et al. |
| 7,693,772 B1 | 4/2010 | Rosenberg |
| 7,698,201 B2 | 4/2010 | Carlson et al. |
| 7,711,619 B2 | 5/2010 | Merton et al. |
| 7,769,659 B2 | 8/2010 | Arena et al. |
| 7,769,664 B2 | 8/2010 | Egan |
| 7,778,907 B1 | 8/2010 | Haskins |
| 7,831,496 B2 | 11/2010 | O'Donnell et al. |
| 7,840,469 B2 | 11/2010 | Mercier et al. |
| 7,853,497 B2 | 12/2010 | Fisher et al. |
| 2001/0014873 A1 | 8/2001 | Henderson et al. |
| 2002/0059123 A1 | 5/2002 | Dunning et al. |
| 2002/2017406 | 11/2002 | Mistretta |
| 2006/0085338 A1 | 4/2006 | Stiff et al. |
| 2007/0100720 A1 | 5/2007 | Bonvouloir |
| 2008/0077519 A1 | 3/2008 | Pedersen et al. |
| 2008/0168006 A1 | 7/2008 | Merton et al. |
| 2009/0138406 A1 | 5/2009 | Reinkemeyer et al. |
| 2009/0144206 A1 | 6/2009 | Eng |
| 2009/0281959 A1 | 11/2009 | Abidi et al. |
| 2010/0121778 A1 | 5/2010 | Castineiras et al. |
| 2010/0262562 A1 | 10/2010 | Hutcheson et al. |
| 2010/0306127 A1 | 12/2010 | Weinberger et al. |
| 2011/0166983 A1 | 7/2011 | Tucker et al. |

OTHER PUBLICATIONS

Gale et al., "Discussion Paper Series (Hamilton Project)". Brookings Institute, Washington: Jun. 2008, Iss. 2; p. 1, 26 pgs.

Feldman, A., "Can This New 401(k) Save Retirement?". BusinessWeek. Feb. 16, 2009, Issue 4119, pp. 61-66.

Montminy et al. "Non-Annuity Income Products Start to Bite". National Underwriter Life & Health-Financial Services Edition. Sep. 8, 2008.

Panko, R., "From assets to income: paying back money to customers requires a business model different from helping them build assets. Insurers are beginning to make the transition.(Retirement Products)". Best's Review ISSN: 1527-5914; vol. 104; Issue 10 Feb. 1, 2004.

"New 401(k) Product Promises DB Certainty". DC Plan Investing date: Nov. 11, 2003.

Sharpe, W. F., "Integrated Asset Allocation" Financial Analysis Journal. Sep.-Oct. 1997. 32 pages.

Austin et al., "Liability-Driven Investment Strategies." BNY Mellon—Asset Management. Oct. 2006. 8 pages.

"2009 Annuity Fact Book". Insured Retirement Institute. 140 pages.

Scott et al. "Efficient Annuitization with Delayed Payout Annuities". Nov. 2006. 49 pages.

Scott et al. "The Longevity Annuity: An Annuity for Everyone?". Jun. 2007. 18 pages.

Non-Final Rejection for U.S. Appl. No. 13/195,447 mailed Dec. 28, 2012.

CREATING AND MAINTAINING A PAYOUT-READY PORTFOLIO WITHIN AN INVESTMENT PLAN TO GENERATE A SUSTAINABLE INCOME STREAM

CROSS-REFERENCE TO RELATED APPLICATIONS

This application is a continuation of U.S. patent application Ser. No. 13/195,447, filed Aug. 1, 2011 now abandoned, which claims the benefit of U.S. Provisional Application No. 61/434,006 filed on Jan. 19, 2011, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2011, Financial Engines, Inc.

BACKGROUND

1. Field

Embodiments of the present invention generally relate to the field of financial advisory services. In particular, embodiments of the present invention relate to systems and methods for preparing an investment plan (e.g., a retirement plan that may have a limited universe of bond funds) for creating a steady lifetime income stream by implementing an in-plan flexible income stream generation mechanism and creating and managing an annuity reserve.

2. Description of the Related Art

Retirees desirous of a lifelong, predictable income stream may be steered toward various types of retirement annuities, such as immediate or longevity annuities, for example; however, the guaranteed payments of an annuity are accompanied by a loss of flexibility in terms of liquidity.

In order to preserve ongoing liquidity, investors may manage fixed-income investments by building a ladder by dividing his/her investment dollars among bonds or certificates of deposit (CDs) that mature at regular intervals. Ideal investments for supporting retirement payouts or a service for creating payments, which fund a series of equal, periodic, nominal-paychecks (e.g., distributions/payouts) for a desired number of years, T, are zero-coupon US Treasury bonds ("zeros"). If zeros of all maturities between one-year and T-years were available to a particular investor, one could statically replicate any annual payment stream without interest-rate risk. Alternatively, a constant maturity Treasury (CMT) bond (an idealized bond whose maturity never changes) with maturity t can be synthesized by purchasing a zero of maturity t, holding it for a length of time $\Delta t$, selling this holding (a bond with maturity $t-\Delta t$), purchasing a new t-year, zero and repeating the cycle every $\Delta t$ years. For yearly rebalancing, a set of CMTs with maturities between one-year and T-years can be used to dynamically replicate the payouts from zeros.

Notably, however, most 401(k) plans lack both zeros and CMTs as investment options. The bond assets available in most 401(k) accounts are bond mutual funds, which do not readily lend themselves to the task of securing a steady stream of payouts.

Consequently, there is a need in the art for determining (i) the capital required to fund a stream of payments from an account having a limited number of investment options and having restrictions on the allowed investment strategies and (ii) a feasible portfolio and ongoing rebalancing to support the funding.

SUMMARY

Financial advisory methods and systems are described for creating a steady lifetime income stream within an investment plan. According to one embodiment, a hybrid approach for creating flexible retirement income is provided. Based on an investor's current holdings in an investment plan, a pattern of periodic cash payouts is identified that can be made to the investor from the investment plan by implementing a payout program. The payout program is created based on an existing limited universe of financial products available for purchase within the investment plan by causing assets of the investment plan to be rebalanced among multiple financial products of the existing limited universe of financial products to form within the investment plan a payout portfolio and an equity exposure portfolio. The payout portfolio is constructed to create an annuity-like stream of income to support the pattern of periodic cash payouts and includes multiple bond funds. The equity exposure portfolio is constructed to address inflation risk by providing the investment plan with an ability to gain from equities markets. Finally, a periodic cash payout of the pattern of periodic cash payouts is caused to be paid to the investor.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
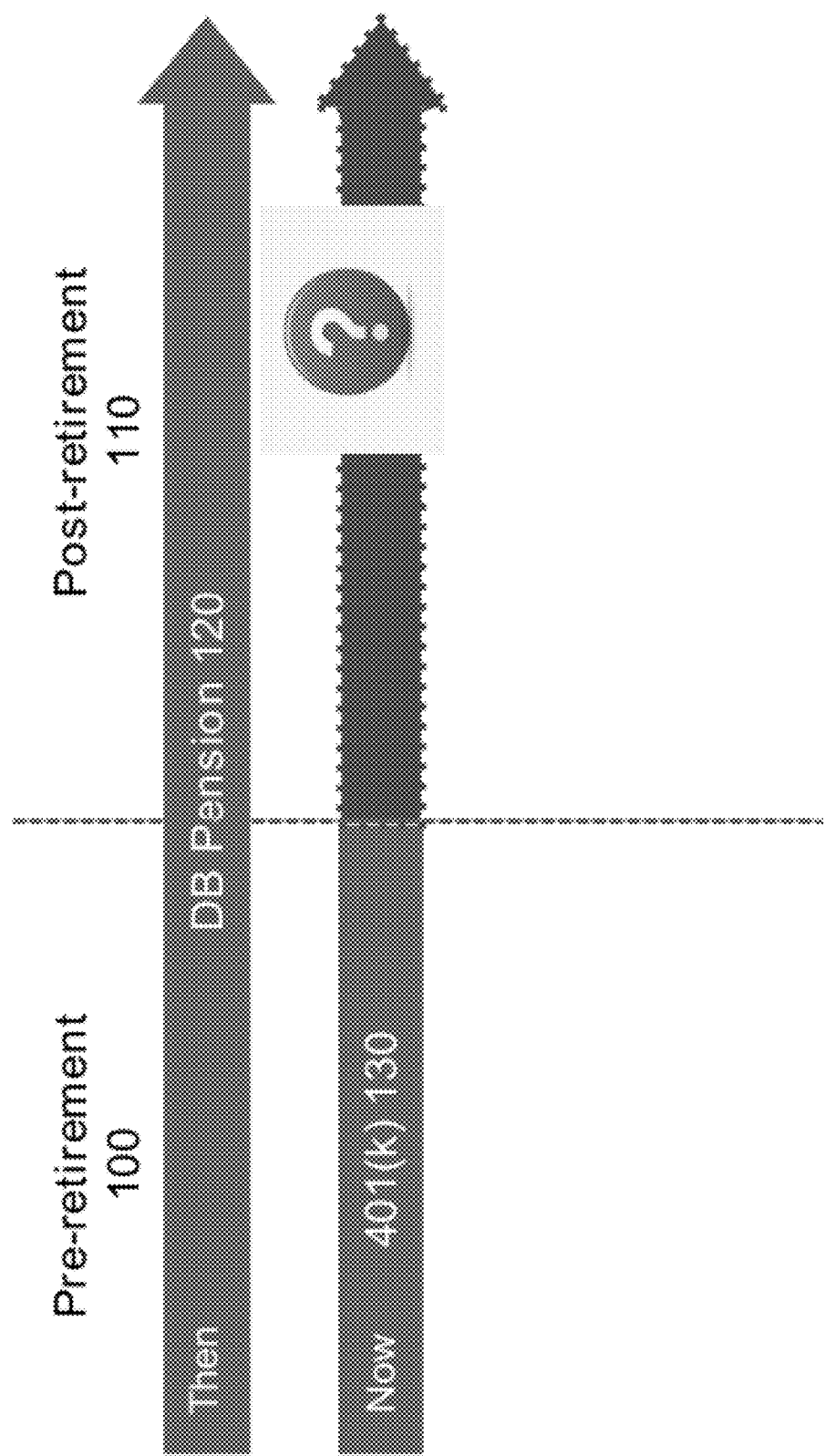
FIG. 1 conceptually illustrates post-retirement uncertainty resulting from the transition from employer-sponsored defined-benefit plans to defined-contribution plans.

Financial advisory methods and systems are described for creating a steady lifetime income stream within an investment plan. According to one embodiment, an investor establishes an income plan for retirement upon which a payout glidepath transition is implemented within the investor's retirement plan to transition from a growth-oriented portfolio to a payout-ready portfolio. For example, retirement payouts may be secured gradually over a number of years (e.g., three to eight years) before retirement (e.g., age 65) to meet the retirement income plan by setting aside a portion of retirement assets within the retirement plan (at times referred to herein as the "payout portfolio") for the creation of a payout program. In this manner, the investor gains protection against unexpected early retirement and also minimizes the potential for a catastrophic hit to income just prior to retirement. Notably, the phrase "payout program" as used herein and defined below generally refers to a set of underlying positions, which creates a payoff similar to that of an annuity, but which does not use annuities to do so.

As noted above, several challenges may arise in the context of a defined-contribution plan, which make it difficult to achieve the characteristics of the ideal hypothetical bond ladder. For example, The plan lineup may not include long-duration bond funds to help immunize desired payouts 10 or 20 years into the future from possible interest rate changes.

Fixed income funds charge management expenses, which detract from future returns.

Fixed income funds may pursue strategies that result in additional risk that is not related to interest rate movements (i.e., basis risk due to index tracking error, active market bets, credit exposure, etc.)

Innovative personalized optimization approaches are described below to approximate the properties of an ideal Treasury bond ladder with the use of existing fixed income fund options in an investor's investment plan (e.g., 401(k) plan). According to one embodiment, the existing fixed income fund options do not provide access to discount bonds, zeros or CMTs.

In one embodiment, when payouts are desired, they can be generated directly from the retirement plan (e.g., a 401(k) plan) by creating an in-plan payout program based on the assets associated with the payout portfolio. Rather than presuming access to any type of desired bond funds or bonds, such as discount bonds, zeros or CMTs, for purposes of bond laddering, embodiments of the present invention are capable of operating in the context of a retirement plan that may have access to only a limited universe of fixed income investments. For example, no zeros or CMTs may be available for purchase in the context of a particular investor's retirement plan. According to one embodiment the limited universe of fixed income investments include, but are not limited to, public corporate bonds, government bonds, public structured bonds, municipal bonds, bond funds and money market accounts.

According to one embodiment, a payout program is constructed to establish a steady yet flexible periodic (e.g., monthly, quarterly or annual) payout to the investor based on retirement plan investment options and such payouts can last for the lifetime of the investor (via an optional annuity purchase (e.g., an immediate annuity or a longevity annuity) with a longevity reserve of the payout portfolio). Unlike traditional annuities, with the flexible income stream generation mechanism, in accordance with embodiments of the present invention, liquidity is preserved while maintaining the benefits of an annuity-like stream of income. The investor is not locked into the payout program. The investor may start or stop payouts (or increase/decrease payouts) at any time as needed or desired; and the investor has full access to their retirement plan for emergencies. Advantageously, in this manner, the investor is provided with less commitment and more flexibility as compared to a scenario involving the purchase of an immediate annuity contract contemporaneously with retirement.

Meanwhile, in one embodiment, the flexible periodic payouts are designed to have both potential upside and limited downside by seeking to achieve a target income floor. In order to keep up with inflation and provide potential upside, the non-payout portion of the portfolio can be used to maintain an appropriate level of exposure to the equities markets. It is to be understood that while inflation risk is addressed, no inflation protection guarantee can be made. Similarly, while downside is limited, there is no downside guarantee until the investor makes an optional annuity purchase (e.g., an immediate annuity or a longevity annuity) at or before age 85.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

In various embodiments, the end user and investor may be at times discussed as if they are separate individuals. Such a situation may arise when an advisor-client relationship exists, for example, between the ultimate end user (e.g., an advisor or sub-advisor) using a financial advisory service (e.g., an in-house platform or a third party service) providing advice in accordance with various embodiments of the present invention and the person or persons whose account(s) (or portion thereof) is being managed; however, it is recognized that the user and the investor may be one in the same. Consequently, it is to be noted that embodiments of the present invention are not limited to scenarios in which an end user interacts with a financial advisory system on behalf of a separate investor.

TERMINOLOGY

Brief definitions of terms used throughout this application are given below.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as an email client.

The terms "connected" or "coupled" and related terms are used in an operational sense and are not necessarily limited to a direct connection or coupling.

The phrases "constant maturity Treasury bond" and "CMT bond" or the acronym "CMT" alone generally refer to an idealized bond whose maturity never changes; however, for purposes of this disclosure, CMT is intended to broadly encompass the notion of both the idealized CMT and a quasi CMT resulting from delays between portfolio trades as described below. A CMT with maturity t can be synthesized by purchasing a zero-coupon Treasury bond of maturity t, holding it for a length of time $\Delta t$, selling this holding (a bond with maturity $t-\Delta t$), purchasing a new t-year, zero-coupon Treasury, and repeating the cycle every $\Delta t$ years. As the holding period $\Delta t$ approaches zero, the idealized CMT is obtained. In embodiments of the present invention, $\Delta t$ may represent the time between portfolio trades therefore resulting in a quasi-CMT. For yearly rebalancing, a set of CMTs with maturities between one-year and T-years can be used to dynamically replicate the payouts from zero-coupon bonds, for example, to replicate a 3-year zero, one could buy and hold a 3-year CMT for one year, then roll it over into a 2-year CMT for one year, and finally a 1-year CMT.

The phrase "equity exposure portfolio" generally refers to a portion of assets within a portfolio (e.g., one or more investment accounts, retirement accounts, investment plans, retirement investment plans or the like) that is used for the purpose of maintaining some level of exposure to the equity market (e.g., stocks, stock funds and/or use of leverage on same, such as margin investing, use of put or call options, stock index futures and/or double short or double long mutual funds). According to one embodiment, approximately 15-25% and typically approximately 20% of the total value of the aggregate retirement investment portfolio assets are allocated to the equity exposure portfolio at the time of retirement (e.g., age 65). In one embodiment, as a result of payouts being made from the payout portfolio and use of the equity exposure portfolio to fund increases in spending, the portion of assets allocated to the equity exposure portfolio gradually decreases over time. For example, by the time the investor is age 85, the equity exposure portfolio may be exhausted and represent approximately 0% of the retirement investment portfolio assets.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

The phrase "longevity reserve portfolio" generally refers to a portion of assets within a portfolio that is for use in connection with an optional annuity purchase at or before the investor turns 85. According to one embodiment, approximately 10-20% and typically approximately 15% of the total value of the retirement investment portfolio assets are allocated to the longevity reserve portfolio at the time of retirement (e.g., age 65). In one embodiment, the longevity reserve portfolio is invested in bond funds and managed to provide sufficient funds to purchase an optional annuity at a future age (e.g., at or before age 85) that would continue the payouts for the life of the investor. In one embodiment, as a result of payouts being made from the payout portfolio and use of the equity exposure portfolio to fund increases in spending, the portion of assets allocated to the longevity reserve portfolio gradually increases over time. For example, by the time the investor is age 85, all or substantially the entire retirement investment portfolio assets may be part of the longevity reserve portfolio.

If the specification states a component or feature "may", "can", "could", or "might" be included or have a characteristic, that particular component or feature is not required to be included or have the characteristic.

The phrase "payout portfolio" generally refers to a portion of assets within a portfolio that is intended to be used for the creation or maintenance of a payout program and/or is currently part of the payout program. According to one embodiment, the payout portfolio is managed in such a way as to generate payouts in retirement that are steady, have upside potential and can last for life via an optional future annuity purchase. According to one embodiment, retirement payouts are secured gradually over a number of years before retirement by increasing a portion of retirement assets within a retirement plan that are associated with a payout program. During the investor's retirement, the concepts of a payout portfolio and a payout program may overlap or become one in the same. For example, all or a portion of the payout portfolio may be used to create the payout program at the time of retirement and thereafter all or a portion of the payout portfolio may be used to maintain the payout program. According to one embodiment, approximately 60-70% and typically approximately 65% of the total value of the retirement investment portfolio assets are allocated to the payout portfolio at the time of retirement (e.g., age 65). In one embodiment, as a result of payouts being made from the principle and/or interest generated by the payout portfolio, the portion of assets allocated to the payout portfolio gradually decreases over time. For example, by the time the investor is age 85, any remaining portion of the payout portfolio may become part of the longevity reserve portfolio, which at this point may represent approximately 100% of the retirement investment portfolio assets.

The phrase "payout program," depending upon the context, generally refers to (i) a set of underlying positions, which creates or otherwise simulates a payout stream similar to that of an annuity, but no portion of which represents or otherwise involves an annuity contract and/or (ii) the collection of payouts resulting from the underlying investment strategy used to generate those payouts. In one embodiment, the payout program comprises a synthetic (i.e., artificial, imitation or simulated) annuity-like income stream generation mechanism resulting from underlying positions consisting essentially of one or more financial products (excluding annuities), typically one or more fixed income investments, which when managed and structured appropriately, in the aggregate are capable of producing an annuity-like stream of income. According to one embodiment, a payout program provides both a steady stream of payouts and provides upside potential. In one embodiment, the payouts are level payouts, but varied payouts are also achievable. As noted above, typical investment accounts do not provide access to zero-coupon bonds or constant maturity treasury (CMT) bonds, which are the ideal investments for supporting a payment service or periodic payout as contemplated herein. As such, according to one embodiment, one unique feature of a payout program is the use of financial products available in the investor's current investment plan (e.g., bond mutual funds, including corporate bond funds, stable-value funds and money market funds available within the investor's retirement investment plan) to represent a portfolio of CMT bonds. For example, in one embodiment, a static or dynamic mapping of bond mutual funds to their corresponding CMT weights may be used.

The phrase "portfolio transition period" generally refers to a period of time during which the investor's portfolio is gradually rebalanced to increase payout protection and ultimately to be made ready to create a payout program. According to one embodiment, retirement payouts are secured gradually over a number of years before retirement to meet an investor's retirement income plan by allocating retirement assets within a retirement investment plan among a payout portfolio, an equity exposure portfolio and a longevity reserve portfolio.

The term "responsive" includes completely or partially responsive.

The term "server" generally refers to an application, program, process or device in a client/server relationship that responds to requests for information or services by another program, process or device (a server) on a network. The term "server" also encompasses software that makes the act of serving information or providing services possible. The term "server" also encompasses software that makes the act of serving information or providing services possible.

FIG. 1 conceptually illustrates post-retirement uncertainty resulting from the transition from traditional employer-sponsored defined-benefit plans to defined-contribution plans. Those planning for retirement are rightfully concerned regarding avoiding big losses within their retirement plan just before retirement, but they also recognize the need to have exposure to equities so they do not run out of money in retirement.

With a defined-benefit (DB) pension 120, an employer guarantees an employee will receive a definite amount of benefit in retirement 110 typically based solely on years of service, regardless of the performance of the underlying investment pool. As such, under the traditional retirement scenario based on a DB pension 120, retirees were able to seamlessly transition from pre-retirement 100 to post retirement 110 without having to consider making the DB pension 120 payout-ready or protecting the assets of the DB pension 120 against a catastrophic hit just prior to retirement.

In contrast, in the context of today's more prevalent defined-contribution plans, such as 401(k) plan 130, an employer and/or the employee make predefined contributions pre-retirement 100, but the final amount of benefit received by the employee post-retirement 110 depends on the performance of the investments in 401(k) plan 130. Importantly, in the context of retirement income being funded by assets in 401(k) plan 130, the retiree now has direct exposure to market fluctuations and cash flow available from 401(k) plan 130 and is dependent upon the asset allocation of 401(k) plan 130. As such, the retiree and/or his/her designee now must take responsibility for both (i) rebalancing assets of the 401(k) plan 130 to make the portfolio payout-ready and (ii) protecting against a market downturn just prior to retirement. Under this model, 401(k) plan 130 is an ideal retirement investment vehicle during pre-retirement 100, but may not meet the steady cash flow needs of retirees during post-retirement 110 causing many retirees to consider cashing in all or some portion of their 401(k) plan 130 to purchase an annuity. At a minimum, 401(k) plan 130 requires some kind of transition plan prior to entering post-retirement 110.

Embodiments of the present invention address various needs of investors in defined-contribution plans in connection with transitioning from pre-retirement 100 to post-retirement 110 and generation of a steady retirement income stream. For example, as described in more detail below, embodiments of the present invention facilitate preparation of a retirement plan for implementation of an in-plan payout program and facilitate creation of a steady lifetime income stream within a retirement plan that may have a limited universe of fixed income investment options by creating and managing a payout portfolio, an equity exposure portfolio and a longevity reserve within the retirement plan.

Figure 2:
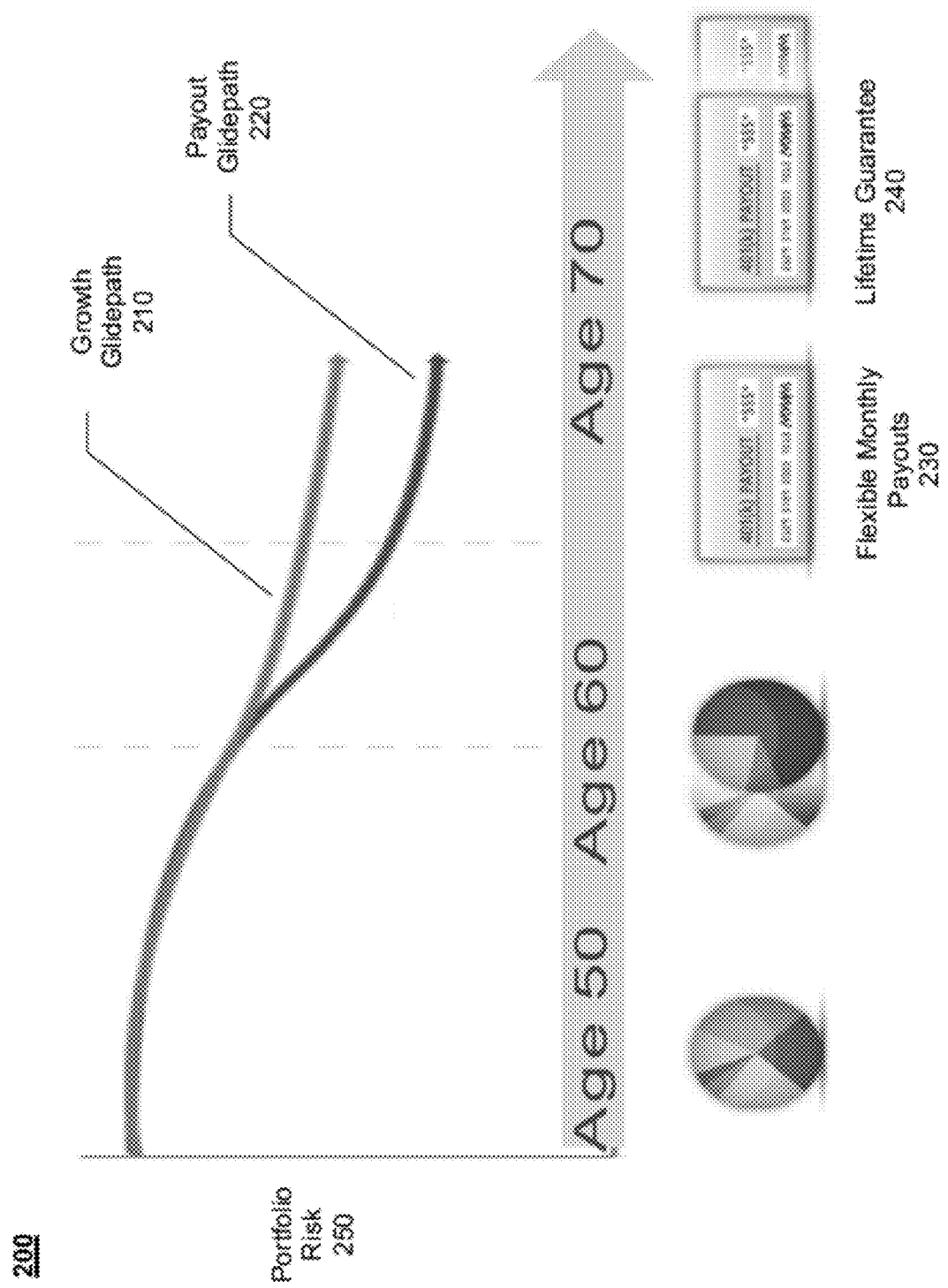
FIG. 2 depicts a graph illustrating differences between portfolio risk at various ages for an investment portfolio on a growth glidepath versus a payout glidepath.

FIG. 2 depicts a graph 200 illustrating differences between portfolio risk at various ages for an investment portfolio on a growth glidepath 210 versus a payout glidepath 220. According to the present example, graph 200 illustrates (i) growth glidepath 210 representing a typical "rule-of-thumb" reduction in investment risk sought to be achieved by a retirement investment plan as an investor approaches and enters retirement; and (ii) payout glidepath 220 representing a clear shift away from a growth orientation to an income objective as sought to be achieved in accordance with embodiments of the present invention.

In the present example, an investor has directly or indirectly communicated to a financial advisory service a desire to begin receiving flexible monthly payouts 230 commencing at age 65. Responsive to this stated goal, the financial advisory service begins transitioning the investor's portfolio over the course of a number of years (typically, between three to eight years) from growth glidepath 210 to payout glidepath 220 to secure the flexible monthly payouts 230 and provide a lifetime guarantee 240 (via an optional annuity purchase with a longevity reserve of the payout portfolio as described further below).

According to embodiments of the present invention, when an investor is within a predefined or configurable transition phase (e.g., three to eight years prior to retirement), a professional management program of a computer-implemented financial advisory service, for example, implementing methods in accordance with various embodiments of the present invention may begin the process of preparing the investor's portfolio for retirement. For example, five years prior to a retirement age specified by the investor, an investment management process may begin to transition the portfolio from a growth orientation to an income objective. In some embodiments, the investment management process may assist the investor prior to an/or during the transition phase in connection with evaluating tradeoffs among various factors, such as savings rate, retirement age and investment risk, as described in commonly owned U.S. Pat. No. 7,062,458, which is hereby incorporated by reference in its entirety for all purposes.

Depending upon the financial advisory model implemented by the service provider, investors may be provided with the opportunity to work with an independent advisor representative to further customize their financial plan by including other household investments, retirement benefits, and/or exploring different retirement dates.

According to the present example, as the investor reaches five years prior to retirement (in this case, at age 60), the financial advisory service begins the process of transitioning the portfolio toward an investment mix designed for generating flexible monthly payouts 230 (e.g., stable yet changeable income payouts). For example, in one embodiment, each year, 20% of the portfolio may be transitioned to an income-ready allocation as described further below. This process is robust to the possibility that investors may retire before their planned retirement age.

According to one embodiment, the transition process from growth glidepath 210 to payout glidepath 220 involves two features. First, the risk of the investor's portfolio is gradually reduced from a portfolio focused on growth five years prior to retirement (e.g., age 60) to a portfolio consistent with an income generation objective at retirement (e.g., age 65). Second, as described in further detail below, the allocations to fixed-income investments within the retirement plan (e.g., a 401(k) account) are optimized to provide a steady stream of income over the participant's lifetime by way of flexible monthly payouts 230 and lifetime guarantee 240.

In some implementations, if an investor elects to receive payouts (e.g., flexible monthly payouts 230) before their planned retirement date, the gradual transition period described above may be accelerated. For example, at a next available portfolio review cycle (typically, within one or two weeks), the retirement plan can be reallocated to produce income immediately. In one embodiment, Internal Revenue Service (IRS) requirements with respect to minimum required distributions after age 70½ are generally handled automatically and taken into consideration in arriving at a recommended amount for flexible monthly payouts 230.

By the planned retirement date (in this case, when the investor reaches age 65), the investor's retirement portfolio is fully transitioned to a payout-ready allocation and is able to generate stable payouts (e.g., flexible monthly payouts 230). Whenever participating investors are ready, they can elect to start receiving flexible monthly payouts 230 from their payout-ready retirement portfolio. In accordance with embodiments of the present invention, once a participating investor has reached retirement and needs to create income from their accumulated balance, the investment strategy is assumed to have a different objective. For example, instead of trying to maximize the expected return of the portfolio for a given level of risk, the investment objective may be sustaining a steady stream of payouts throughout retirement.

Figure 3:
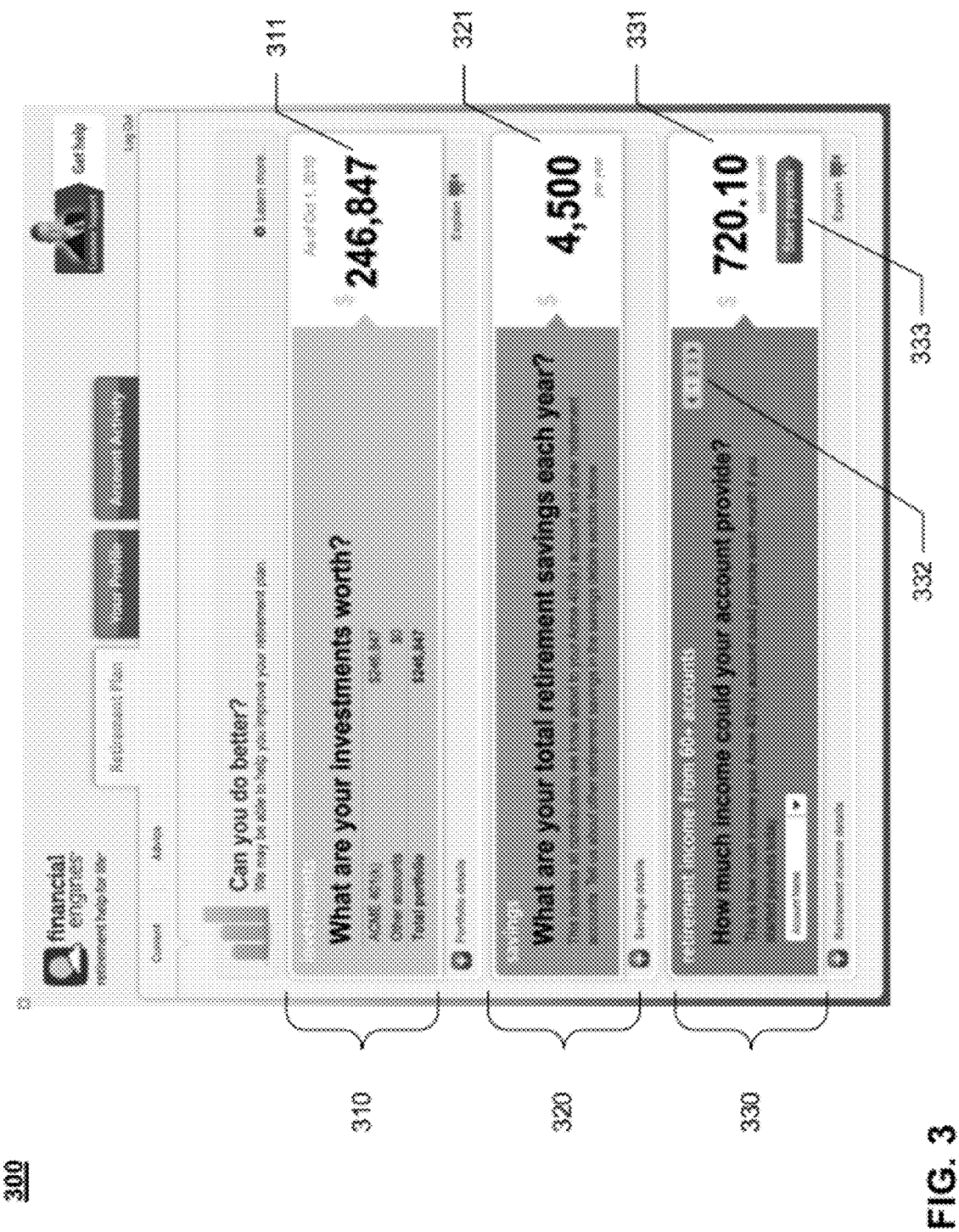
FIG. 3 illustrates a retirement plan web page of an online financial advisory service in accordance with an embodiment of the present invention.

FIG. 3 illustrates a retirement plan web page 300 of an online financial advisory service in accordance with an embodiment of the present invention. According to the present example, retirement plan web page 300 presents information regarding an investor's investments in an investment portion 310, information regarding the investor's retirement savings in a savings portion 320 and information regarding potential flexible monthly payouts in a retirement income portion 330.

As described in further detail below, based on current retirement plan holdings 311 and information regarding contributions to the retirement plan 321, a financial advisory service implementing the methods described herein may provide information regarding immediately available flexible monthly payouts 331 that are thought to be capable of being sustained through retirement.

In one embodiment, the financial advisory service allows the investor to immediately begin payouts after the next portfolio rebalancing opportunity by selecting the "Start payouts" button 333. Other views of retirement income portion 330 available to the inventor via control 332 may present information regarding flexible monthly payouts achievable in the future (e.g., at a specified retirement age) or may allow the investor to view different payout options based on delaying or accelerating retirement, increased/decreased contributions to the retirement plan and/or changes to the investment risk characteristics of the retirement portfolio.

Figure 4:
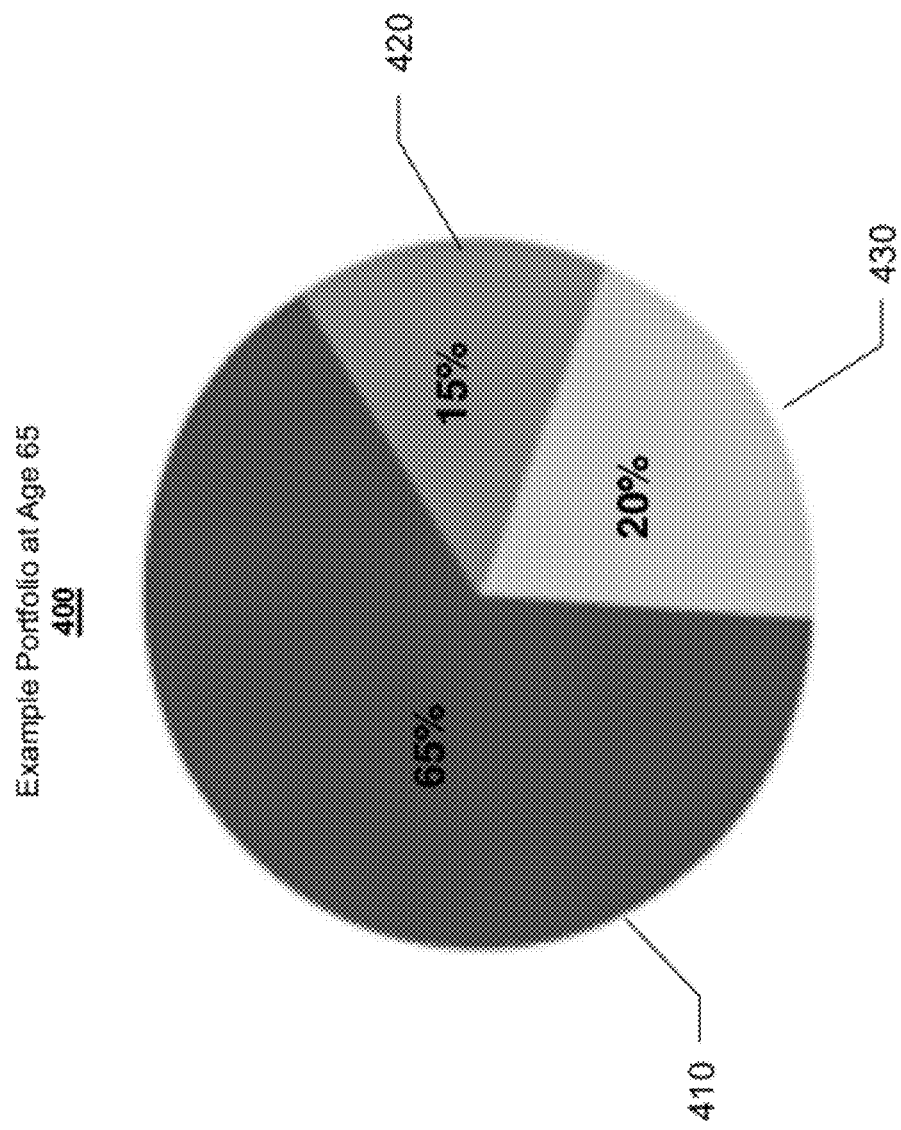
FIG. 4 is a pie chart depicting a payout-ready portfolio allocation in accordance with an embodiment of the present invention.

FIG. 4 is a pie chart 400 depicting a payout-ready portfolio allocation in accordance with an embodiment of the present invention. As described further below, in accordance with one embodiment, investment options available in the investor's investment plan (e.g., a DC plan, such as a 401(k) plan, a 403(b) plan, an employee stock ownership plan, a profit sharing plan and the like) along with an optional future purchase of an annuity outside of the plan are used to deliver a desired lifetime income stream to the investor in an efficient manner. In one embodiment, an income-ready portfolio is created by dividing the investor's retirement portfolio into three parts: (i) a first portion of assets, which is invested to create a floor level of spending from retirement up to age 84; (ii) a second, smaller portion of the assets, which is used to cover the costs of extending the floor income beyond age 85 for life through the optional purchase of a fixed immediate annuity, for example, outside of the investor's investment plan; and (iii) a remaining third portion of the assets, which is invested in a portfolio of diversified equity to fund spending increases in the payouts over time by converting stocks to bonds each year, for example. Thus, in one embodiment, the lifetime income liability for an investor resembles a mortgage with multiple payments of a consistent amount followed by a large "balloon" payment to enable the purchase of a lifetime annuity. The second portion of assets described above covers the cost of an annuity purchase at any time up to age 85 that will maintain the payouts for life. If desired, an investor can choose to lock-in their payouts for life earlier in retirement, at any time from retirement up to age 85.

Assuming for purposes of this example, an investor has communicated his/her desire to begin receiving flexible monthly payouts at age 65, a financial advisory service employing various embodiments of the present invention, may transition the investor's portfolio into a payout-ready allocation made up of a payout portfolio 410, a longevity reserve allocation made up of a longevity reserve portfolio 420 and an equity allocation made up of an equity exposure portfolio 430 to match the future expected liabilities (e.g., flexible payouts during retirement and an optional annuity purchase at or before age 85).

In some embodiments, in the context of a participating investor, structuring asset portfolios appropriately means developing an investment strategy that will deliver desired annual income payouts with very high confidence. To have high confidence in a future payout, it is desirable to immunize the liability against possible changes in interest rates and/or the stock market. If the assets in the portfolio are appropriately matched to the expected liabilities, then the portfolio will support the liabilities in all possible future market states. In some implementations, the notion of matching a desired, stable income stream, with a specific investment strategy to deliver the income payouts with very high probability is central to the methodology; however, in other implementations, the income stream can be personalized to address specific financial circumstances unique to the investor at issue.

In one embodiment, after the portfolio transition period and on or about the date of the investor's retirement, payout portfolio 410 represents approximately 60-70% and typically approximately 65% of the total retirement plan assets at age 65. The precise allocation to the floor spending may vary based on prevailing interest rates and inflation, but under current interest rates, approximately 65% of the portfolio assets are devoted to supporting the income floor. Longevity reserve portfolio 420 may represent approximately 10-20% and typically approximately 15% of the total retirement plan assets at age 65 assuming current interest rates. Equity exposure portfolio 430 represents approximately 15-25% and typically approximately 20% of the total retirement plan assets at age 65. According to one embodiment, the purpose of equity exposure portfolio 430 is to provide a built-in cost of living adjustment for future income payouts.

According to embodiments of the present invention, payout portfolio 410 is intended to be used for the creation or maintenance of a payout program and is comprised of fixed income securities or funds; longevity reserve portfolio 420 is for use in connection with an optional annuity purchase before the investor turns 85 and is comprised of fixed income securities or funds; and equity exposure portfolio 430 is used for the purpose of maintaining some level of exposure to the equity market and is comprised of diversified equity investments. Those skilled in the art will appreciate allocation of fixed income and equity at the retirement date is a function of the retirement age, current interest rates and inflation.

Figure 5A:
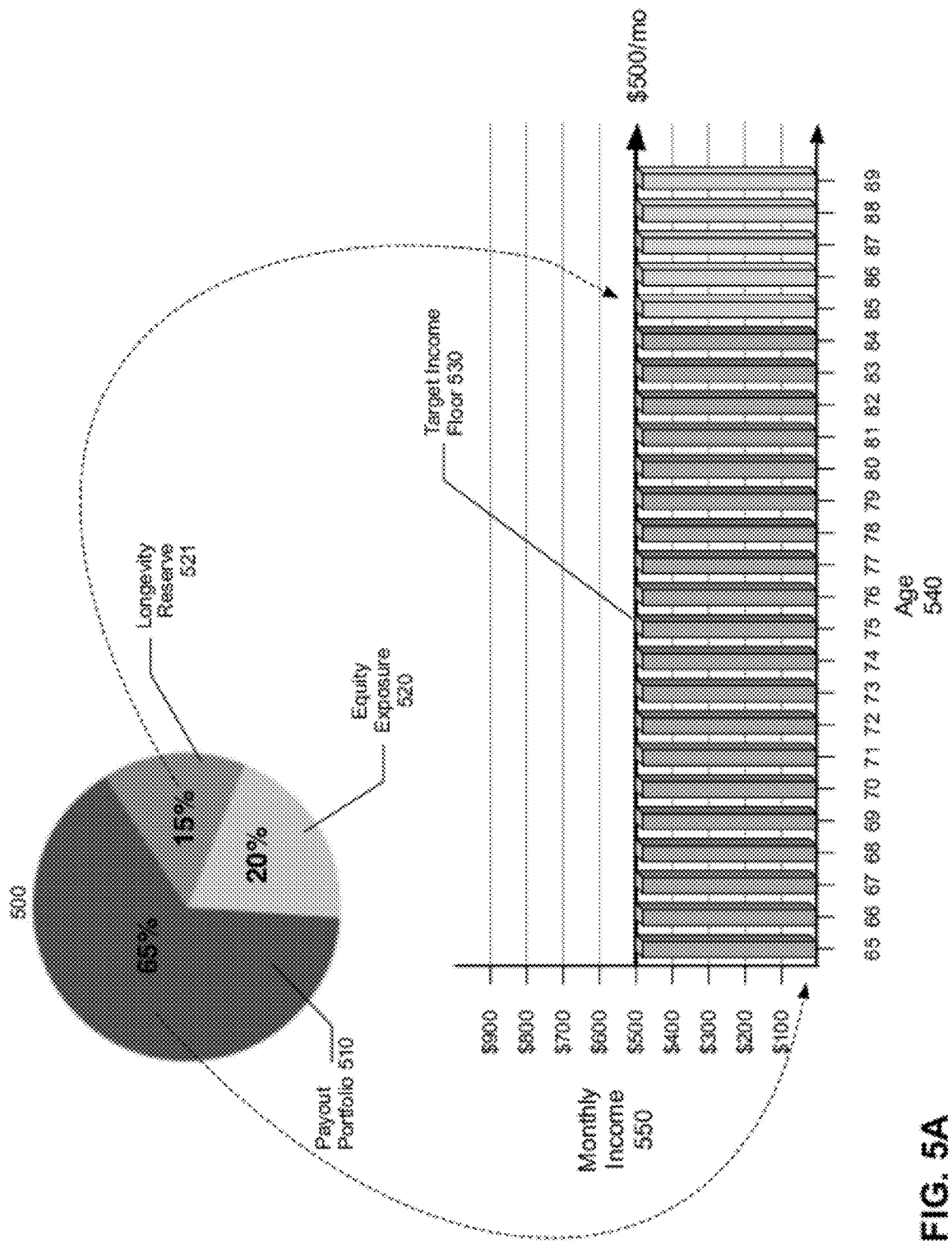
FIG. 5A is a bar chart that illustrates retirement payouts and 85+ annuity payouts supported by a payout-ready portfolio in accordance with an embodiment of the present invention.

FIG. 5A is a bar chart that illustrates retirement payouts and 85+ annuity payouts supported by a payout-ready portfolio 500 in accordance with an embodiment of the present invention. In the present example, the y-axis represents a monthly income 550 paid out of the payout-ready portfolio 500 to the inventor and the x-axis represents an age 540 of the investor. While the present example is described in the context of maintaining at least a target income floor 530 by way of payouts from payout-ready portfolio 500, it is contemplated that factors other than maximizing the likelihood of maintaining target income floor 530 may be optimized, including, but not limited to, the ability to achieve greater upside potential, the ability to incorporate future lump sum distributions, the ability to "smooth" lifetime income, the ability to incorporate arbitrary patterns of payouts over time, the ability to optimize timing of Social Security benefits and the incorporation of bequeathment preferences.

According to the present example, payout-ready portfolio 500 comprises three distinct portfolios, including a payout portfolio 510, an equity exposure portfolio 520 and an optional longevity reserve portfolio 521. In one embodiment payout-portfolio 510 is comprised of financial products available in the investor's current investment plan, which may have limited types of fixed income options. In this manner, as described further below, an in-plan payout program may be created for the benefit of the investor based on the limited universe of fixed income funds available and without having to transfer custody of the plan assets. In one embodiment, the limited universe of bond funds available within the retirement plan at issue are collectively managed and structured to produce a stable, annuity-like stream of income beginning at the time of retirement (e.g., age 65) and extending to at least a time at which the investor may purchase an optional annuity (e.g., before age 85).

The optional longevity reserve portfolio 521 may include fixed income securities or funds that are optimized for the purchase of an optional annuity by the investor before age 85 that will provide the investor with income for life comparable to that experienced during retirement.

Figure 5B:
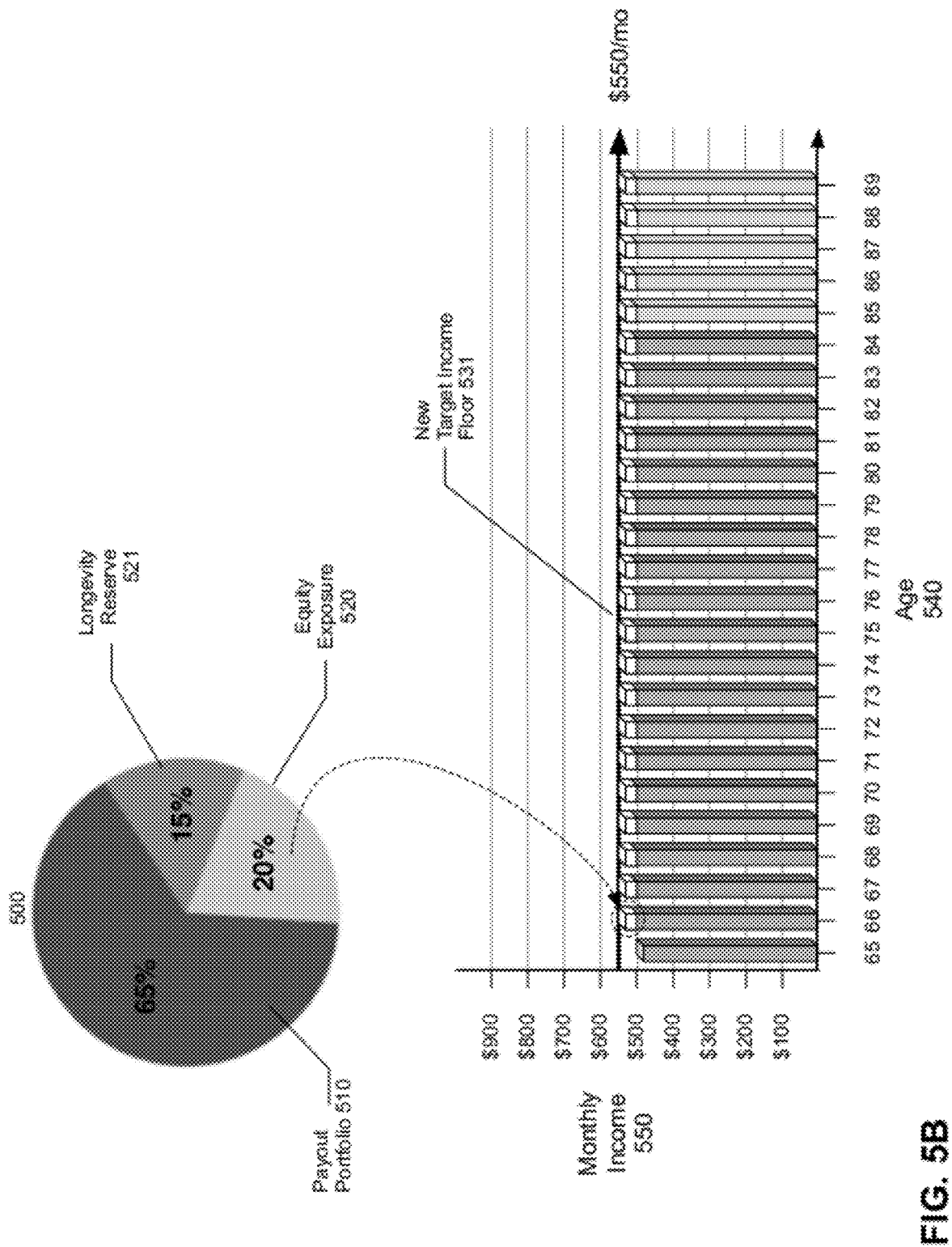
FIGS. 5B and 5C are bar charts illustrating potential increases in retirement payouts and 85+ annuity payouts that may result from gradually reducing the equity exposure and utilizing the proceeds to increase payouts in accordance with an embodiment of the present invention.
Figure 5C:
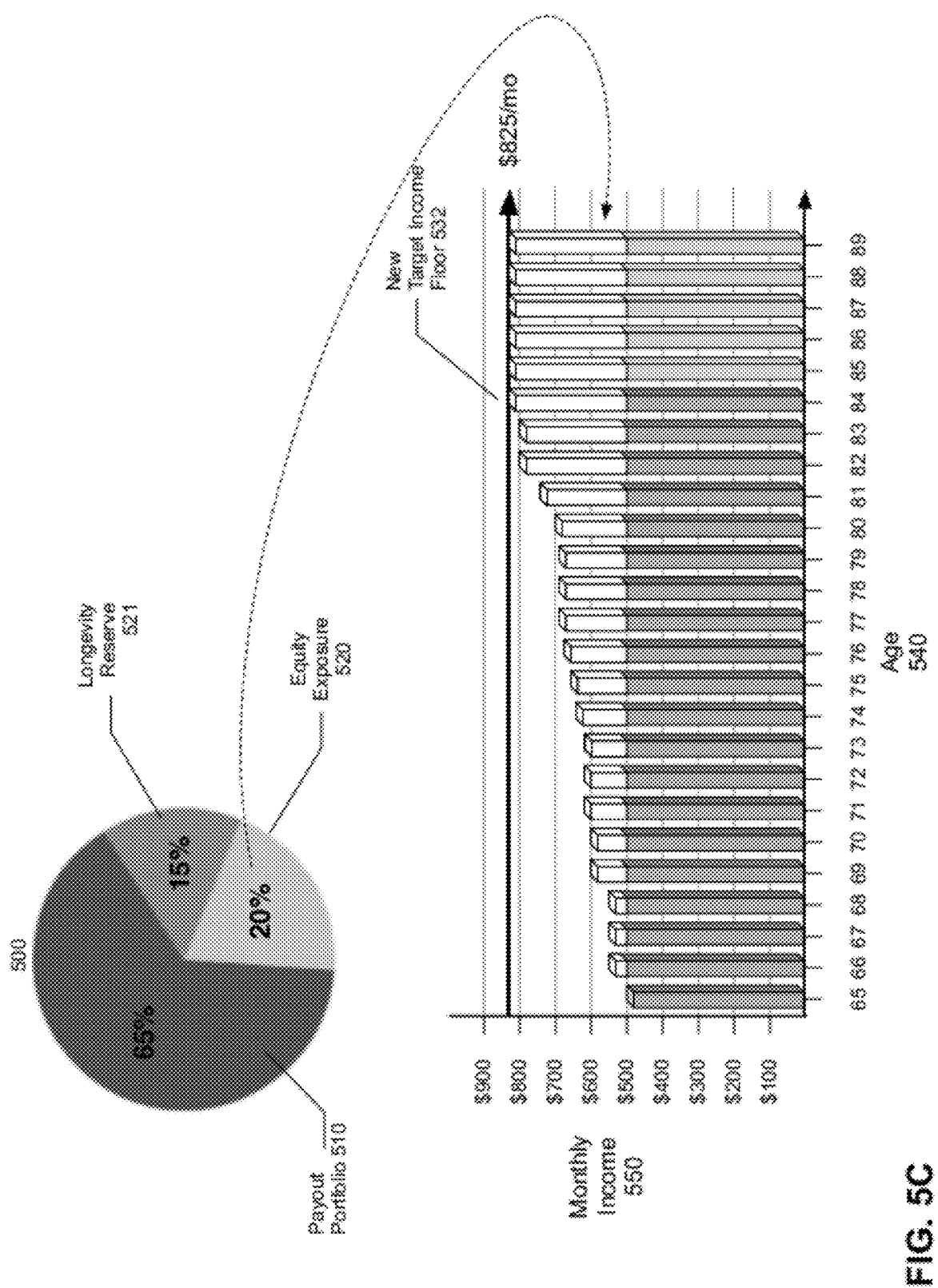

FIGS. 5B and 5C are bar charts illustrating potential increases in retirement payouts and 85+ annuity payouts that may result from gradually reducing the equity exposure and utilizing the proceeds to increase payouts in accordance with an embodiment of the present invention. Equity exposure portfolio 520 of payout-ready portfolio 500 may be structured and managed to provide a desired level of exposure to equities by way of stocks, stock funds and the like and/or use of leverage on same, such as margin investing, use of put or call options, stock index futures and/or double short or double long mutual funds. In one embodiment, growth of equity exposure portfolio 520 may be used at least in part to increase the investor's monthly income 550 to a new target income floor 531. According to one embodiment, the portion of the overall payout-ready portfolio 500 represented by equity exposure portfolio 520 is reduced overtime. For example, equity exposure portfolio 520 may initially represent 20% of the overall payout-ready portfolio 500 at age 65 and its overall representation may be reduced by 1% per year; therefore, representing no more than approximately 10% of the payout portfolio at age 75 and approximately 0% at age 85.

As described further below, in one embodiment, a financial advisory service implementing embodiments of the present invention attempts to balance an individual's desire for steady payouts with the potential for upside based on stock market returns. To achieve these dual objectives, a majority of the payout-ready portfolio 500, approximately 80% at age 65, may be allocated to secure steady payouts during retirement. The remainder of the payout-ready portfolio 500 may then be invested in a diversified portfolio of equity funds. In one embodiment, throughout retirement, the target allocation for equities (e.g., equity exposure portfolio 520) is gradually reduced from 20% at age 65 to 0% by age 85. Should the actual equity allocation exceed the target allocation, then the equity allocation may be reduced, and the surplus may be used to fund increased spending by purchasing more of the one or more fixed income assets supporting the floor (e.g., target income floor 530, new target income floor 531 or new target income floor 532) and/or longevity reserve portfolio 521. In one embodiment, maximum equity allocations are defined by Table 1, below:

TABLE 1

Equity Allocations by Age

| Age | Maximum Equity Allocation |
|---|---|
| 55 | 22% |
| 60 | 21% |
| 65 | 19% |
| 70 | 16% |
| 75 | 13% |
| 80 | 8% |
| 85 | 0% |

Notably, however, equity allocation may vary based on prevailing interest rates and inflation. For example, in high inflationary and high interest rate environments, equity allocations for the portfolio may be increased beyond those listed in Table 1 to improve the probability that payouts keep pace with inflation.

Figure 6:
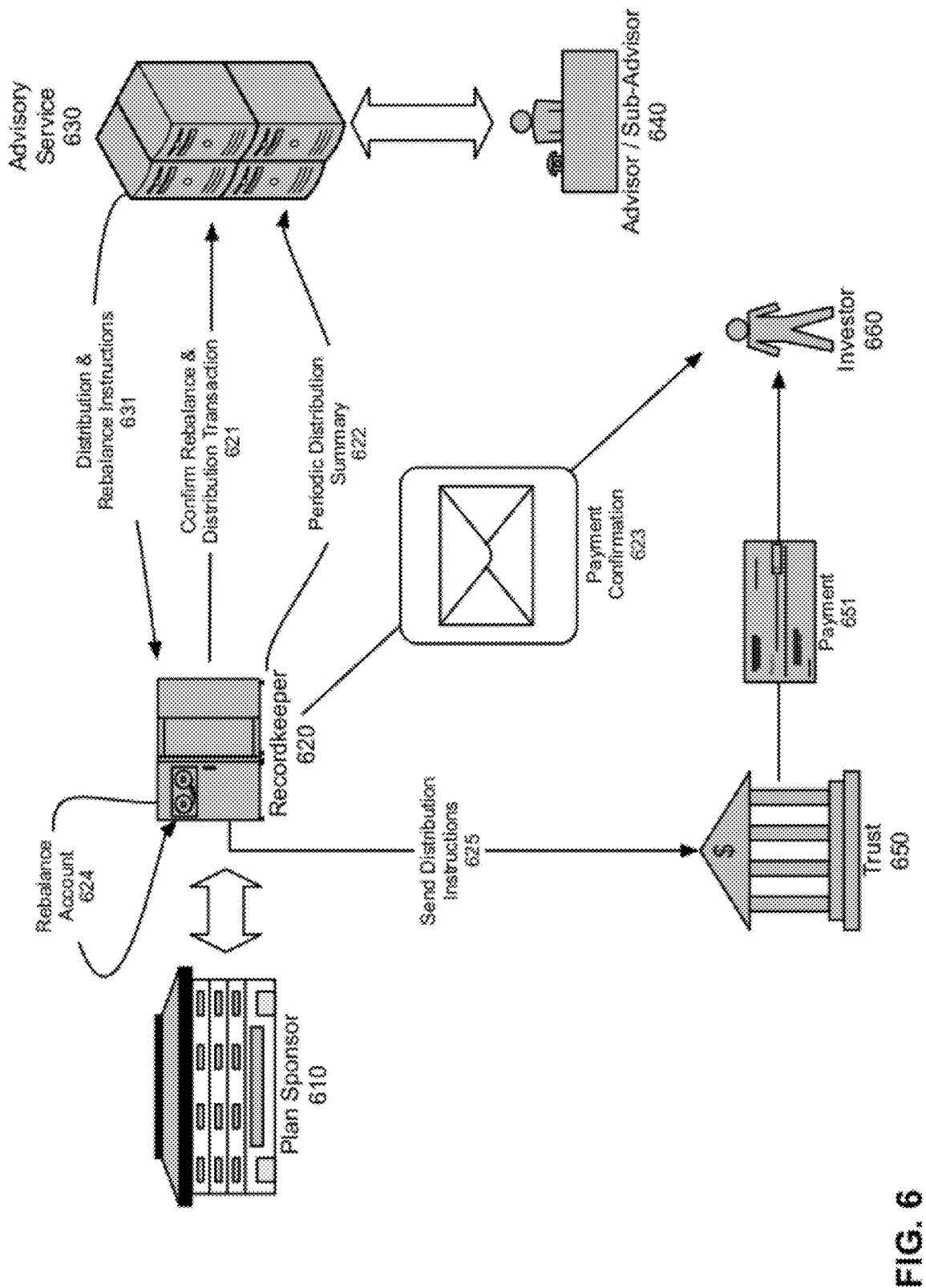
FIG. 6 is a high-level conceptual illustration of how various entities interact and how a payout program works operationally in accordance with an embodiment of the present invention.

FIG. 6 is a high-level conceptual illustration of how various entities interact and how a payout program works operationally in accordance with an embodiment of the present invention. According to the present example, an advisory service 630 may provide a payment service for investors (e.g., investor 660—a member of advisory service 630). A recordkeeper 620, e.g., a DC provider, of a retirement plan sponsored by a plan sponsor 610 receives distribution & rebalance instructions 631 from advisory service 630 on behalf of investor 660, acting on instructions from advisor/sub-advisor 640.

According to one embodiment, rebalance instructions generally consist either of buy/sell instructions or portfolio holdings targets for a particular rebalance account 624. Distribution instructions 625 typically specify the amount and/or possible timing of a distribution to be made from an investment account of investor 660. To fulfill distribution instructions 625, recordkeeper 620 sends distribution instructions 625 to a trust 650, which then issues a payment 651 to investor 660 in the form of a direct transfer or a check, for example.

At or about the same time, recordkeeper 620 sends a payment confirmation 623 to investor 660. As distribution & rebalance instructions 631 are fulfilled, recordkeeper 620 will typically confirm rebalance & distribution transaction 621 with advisory service 630. In addition, recordkeeper 620 may furnish periodic confirmations and/or other periodic notices (e.g., distribution summary 622) to advisory service 630.

Those skilled in the art will recognize more or fewer entities may be involved and interactions among the various entities may be different than as described with reference to this particular example. As such, the particular entities involved and the specific interactions described with reference to FIG. 6 are intended to be illustrative only and in no way should this example limit the scope of the invention.

Figure 7:
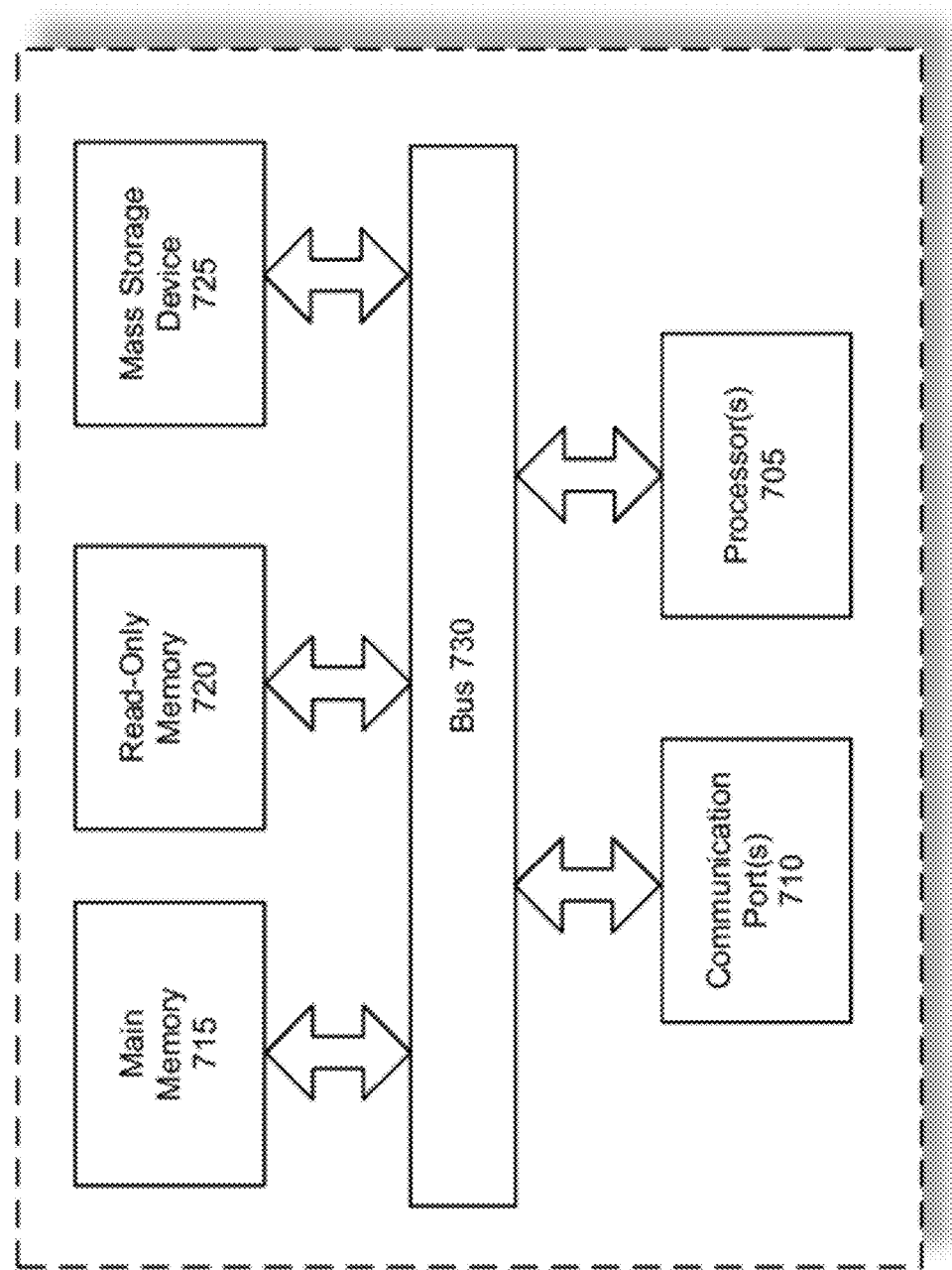
FIG. 7 is an example of a computer system with which embodiments of the present invention may be utilized.

FIG. 7 is an example of a computer system with which embodiments of the present invention may be utilized. Embodiments of the present invention include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware. As such, FIG. 7 is an example of a computer system 700, such as a workstation, personal computer, laptop, client, server or the like, upon which or with which embodiments of the present invention may be employed.

According to the present example, the computer system includes a bus 730, one or more processors 705, one or more communication ports 710, a main memory 715, a removable storage media 740, a read only memory 720 and a mass storage 725.

Processor(s) 705 can be any future or existing processor, including, but not limited to, an Intel® Itanium® or Itanium 2 processor(s), or AMD® Opteron® or Athlon MP® processor(s), or Motorola® lines of processors. Communication port(s) 710 can be any of an RS-232 port for use with a modem based dialup connection, a 10/100 Ethernet port, a Gigabit port using copper or fiber or other existing or future ports. Communication port(s) 710 may be chosen depending on a network, such a Local Area Network (LAN), Wide Area Network (WAN), or any network to which the computer system 700 connects.

Main memory 715 can be Random Access Memory (RAM), or any other dynamic storage device(s) commonly known in the art. Read only memory 720 can be any static storage device(s) such as Programmable Read Only Memory (PROM) chips for storing static information such as start-up or BIOS instructions for processor 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can include a bus, such as a Peripheral Component Interconnect (PCI)/PCI Extended (PCI-X), Small Computer System Interface (SCSI), USB or the like, for connecting expansion cards, drives and other subsystems as well as other buses, such a front side bus (FSB), which connects the processor(s) 705 to system memory.

Optionally, operator and administrative interfaces, such as a display, keyboard, and a cursor control device, may also be coupled to bus 730 to support direct operator interaction with computer system 700. Other operator and administrative interfaces can be provided through network connections connected through communication ports 710.

Removable storage media 740 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the invention.

Figure 8:
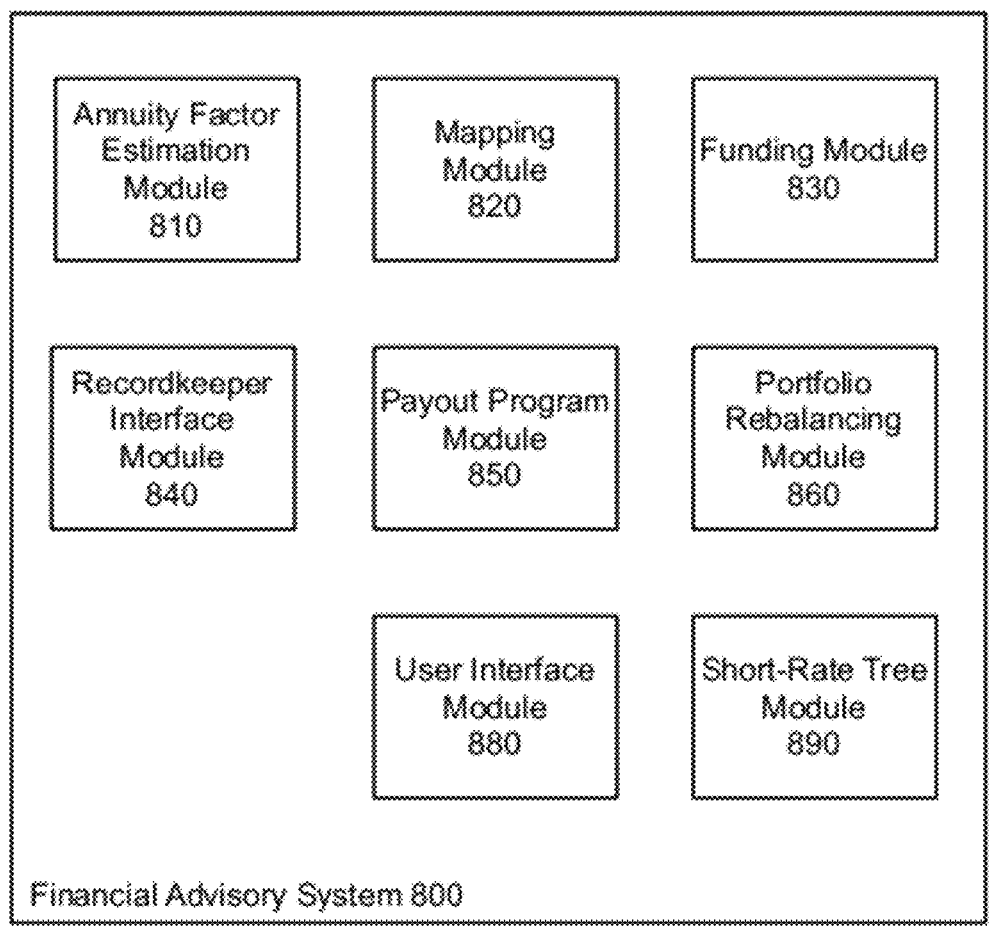
FIG. 8 is a software architecture block diagram conceptually illustrating exemplary functional units of a financial advisory system in accordance with an embodiment of the present invention.

FIG. 8 is a software architecture block diagram conceptually illustrating exemplary functional units of a financial advisory system 800 in accordance with an embodiment of the present invention. In the present example, financial advisory system 800 is shown as including an annuity factor estimation module 810, a mapping module 820, a funding module 830, a recordkeeper interface module 840, a payout program module 850, a portfolio rebalancing module 860, a payout module 870, a user interface module 880 and a short-rate tree module 890.

With an annuity, one pays a lump sum in return for a guaranteed income stream in the future. As described further below, at or before age 85, various embodiments of the present invention assume the investor will purchase an optional annuity from which spending after age 85 is derived. The cost of the optional annuity is specified in terms of an annuity factor A, which represents the amount of money it takes to purchase an annuity that pays $1 annually for the rest of the investor's life. To the extent the annuity factor A is desired to be estimated, annuity factor estimation module 810 may perform this function by performing a present value calculation based on mortality tables and current interest rates and investments available in the investor's investment plan. Alternatively, annuity factor A may be a value provided to financial advisory service 800 from an external source.

To support creation of a payout portfolio that approximates the properties of an ideal Treasury bond ladder based on the limited universe of fixed income investments available to the investor, Mapping module 820 may create a dynamic mapping of fixed income investments available in the investment plan at issue to their corresponding CMT weights. Alternatively, a static mapping may be consulted. In any event, in one embodiment, the CMT equivalent return of one or more fixed income investments is the weighted sum of their component CMT returns, adjusted for fees.

Funding module 830 may be used to determine a minimum cost of funding the desired pattern of payments.

Recordkeeper interface module 840 may electronically communicate instructions (e.g., distribution and rebalance instructions 631) to the recordkeeper (e.g., recordkeeper 620) and receive electronic confirmations (e.g., confirm rebalance and distribution transaction 621) and/or other periodic notices (e.g., periodic distribution summary 622) from the recordkeeper.

Payout program module 850 may represent the main control module for calling and coordinating the other modules. For example, upon determining a need for rebalancing the portfolio at issue, payout program module 850 may receive appropriate rebalancing parameters by calling portfolio rebalancing module 860.

Portfolio rebalancing module 860 may determine appropriate allocations of the assets of the investment plan at issue among a payout portfolio, an equity exposure portfolio and a longevity reserve portfolio and how such allocations are to be achieved based on the financial products available within the investment plan at issue.

User interface module 880 may interact with end user to, among other things, present information regarding an investor's current investments in an investment plan, present information regarding the investor's current rate of contributions to the investment plan and present information regarding potential flexible monthly payouts that may be achievable from the investment plan. User interface module 880 may also allow the end user to view different payout options and related tradeoffs (e.g., based on delaying or accelerating retirement, increased/decreased contributions to the retirement plan and/or changes to the investment risk characteristics of the portfolio) as well as request commencement or stoppage of the payment service.

Short-rate tree module 890 may implement the desired short-rate tree model.

In one embodiment, the functionality of one or more of the functional units may be merged in various combinations. Moreover, the functional units can be communicatively coupled using any suitable communication method (e.g., message passing, parameter passing, and/or signals through one or more communication paths etc.). Additionally, the functional units can be physically connected according to any suitable interconnection architecture (e.g., fully connected, hypercube, etc.).

According to embodiments of the invention, the functional units can be any suitable type of logic (e.g., digital logic) for executing the operations described herein. Any of the functional units used in conjunction with embodiments of the invention can include machine-readable media including instructions for performing operations described herein. Machine-readable media include any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, or other current or future forms of tangible and non-transitory computer-readable memories.

Before discussing details of various algorithms that may be used in accordance with embodiments of the present invention, it is helpful to first put the problem into context and explain the various mathematical models described herein as well as the notation used in connection with the various mathematical models. One goal of a retirement payment service in accordance with embodiments of the present invention is to make a best effort to preserve an investor's fixed annual nominal spending. In the years between retirement and age eighty-five, the service may invest in low-risk bond funds to ensure the spending. At or before age 85, various embodiments assume that the investor purchases an annuity and subsequent spending is derived totally from this insurance product. The cost of this annuity is specified in terms of an annuity factor A—it takes $A to purchase an annuity that pays $1 at purchase and annually for the rest of the investor's life. The annuity factor for an 85 year-old is typically between 6 and 7. Depending upon the particular implementation, the annuity factor, A, may be a given or may be estimated based on a simple present value calculation based on mortality tables, current interest rates and investments available in the investor's investment plan.

Notably, the algorithms described herein are able to generate and price an arbitrary pattern of payouts. For example, instead of a fixed, level payout per year, the calculation can be structured to individually determine each year's payout independently. This facilitates achieving any desired pattern of annual or periodic payments. For example, pricing a dollar of payout five years from now would use an annual cash flow stream of [0,0,0,0,0,1,0, . . . ,0], the first element of which corresponds to "time zero" or today. With a collection of multiple strategies, an investor's desire for arbitrary payouts can be priced and fulfilled.

In various embodiments of the present invention, for simplicity and efficiency, it is assumed that nominal spending is yearly and constant. Further, stub-year effects are ignored and it is assumed that the investor's birthday is today and that he/she will receive this year's payment today. Hence, the investor expects T−1 additional payment checks, where T is the number of years until his/her $85^{th}$ birthday, and on that birthday, he/she will receive a lump sum for an annuity purchase. If the investor's spending level L were to remain constant, then his/her cash-flow stream is $L*[1, 1, \ldots, 1, A]$, where A is the annuity factor; however, in accordance with various embodiments, the spending level L is designed to ratchet upwards from year to year. Nonetheless, the problem at hand is to lock in the payout stream at level L at minimal cost.

According to one embodiment, the spending level L is determined in subsequent years based on an age-based schedule of minimum allocations to the floor portfolio. For example, this schedule could be 80% minimum floor at age 65, 81% at age 66, and continuing on up to 100% by age 85. Each year, the cost of maintaining the previous years spending level for life (i.e. the cost of $L*[1, 1, \ldots, A]$) is calculated. If this cost is less than the minimum floor allocation of the investment account for that year, then the payout amount can be increased to be consistent with the minimum floor. If this cost exceeds the minimum floor, then the payout level is not increased that year. In this manner, growth of the equity exposure portfolio and/or some portion (or all of) the equity exposure portfolio may be gradually reallocated to the payout portfolio (e.g., converted to bond allocation) and used to support spending increases. The magnitude of the spending increase will depend on the performance of the equity market.

Figure 9:
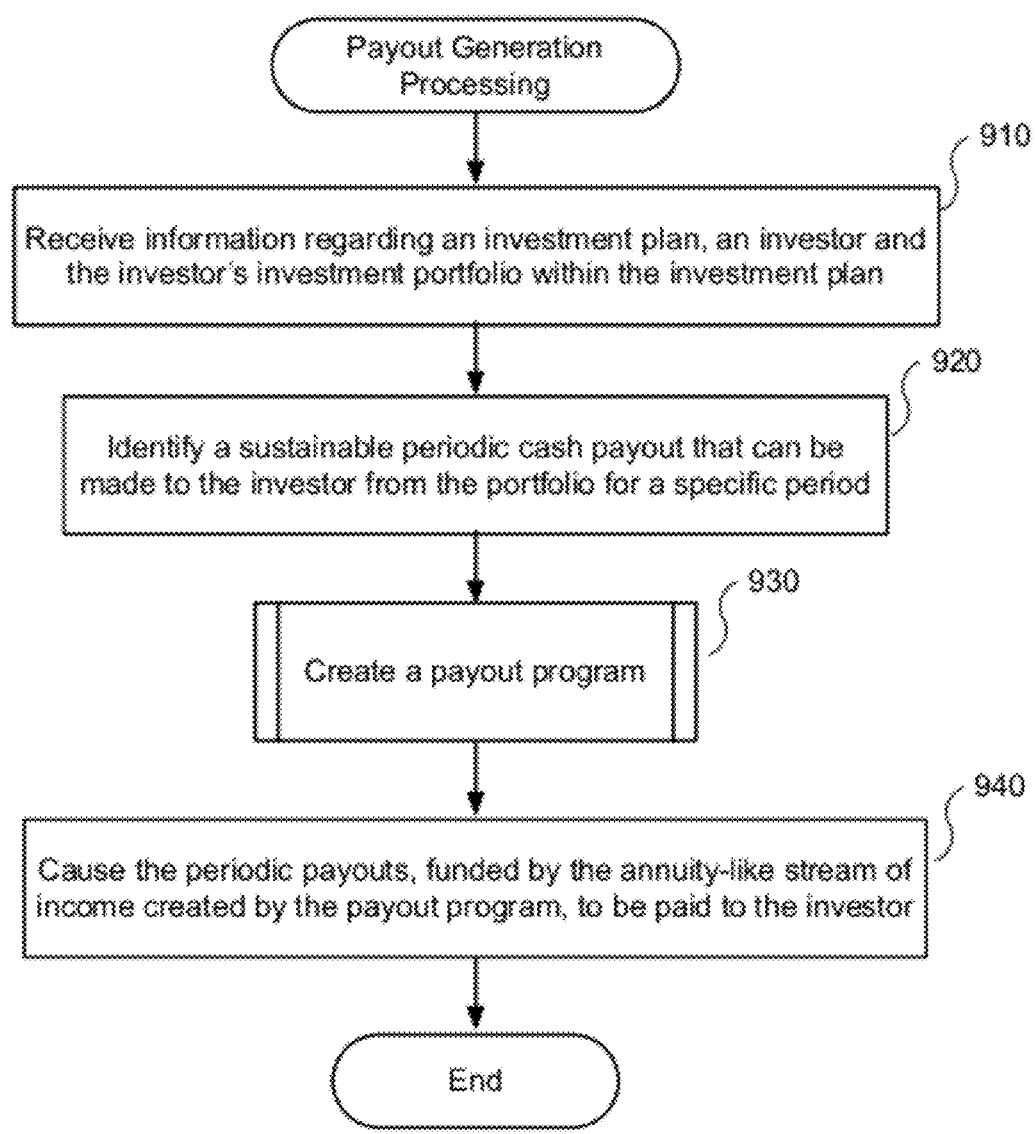
FIG. 9 is a flow diagram illustrating payout generation processing in accordance with an embodiment of the present invention.

FIG. 9 is a flow diagram illustrating payout generation processing in accordance with an embodiment of the present invention. Depending upon the particular implementation, the various process and decision blocks described with respect to this flow diagram and others may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 910, information regarding an investment plan, an investor and the investor's investment portfolio within the investment plan is received. According to one embodiment, the information includes the investor's current age, the investor's desired retirement age, the nature and type of each of the financial products available for investment within the investment plan, a total value of all assets within the investment portfolio and the like. More or less information may be required depending upon the particular implementation.

Notably, while embodiments of the present invention may be described with reference to retirement plans, including, but not limited to, a Roth or traditional Individual Retirement Account (IRA), a Simplified Employee Pension (SEP) plan, an employer-sponsored retirement account (e.g., a 401(k), 403(b) or 457 plan), the investment plan need not be a tax-advantaged retirement plan and can take on many different forms, including, but not limited to a taxable individual investment account, a brokerage account, a money market bank account, an insurance policy, a college investment plan and the like.

At block 920, a sustainable periodic cash payout is identified that can be paid to the investor from the investment portfolio for a specific period of time (the payout period). In one embodiment, the payout period begins at the time the investor retires and continues until the investor reaches the age of 85, at which point it is assumed that the investor will purchase an annuity that provides payouts for the rest of his/her life. In other embodiments, the payout period may begin one or more years before or after retirement and/or end prior to the investor reaching the age of 85. In one embodiment, if the inventor chooses not to purchase an annuity at or before the age of 85, the payout period continues for a number of years (e.g., until the investor is in his/her early 90's).

As described further below, according to one embodiment, the financial advisory service identifies a sustainable annual payout that can begin immediately and can be funded until the investor reaches the age of 85 by deriving the annual payout amount based on an assumption that a predetermined percentage (e.g., 65%) of the investor's portfolio will be used to produce cash to support the annual payouts. In alternative embodiments, the investor may be advised of various trade-offs, including, putting off payouts for one or more years, opting for greater or lesser payouts and the like. In alternative embodiments, the percentage of the investor's portfolio allocated to supporting the payout stream is configurable by the investor or a representative of the investor. Alternatively, the investor or his/her representative may be permitted to configure or specify the payout amounts and the percentage of the investor's portfolio dedicated to producing the cash flow in support of the periodic payouts may be adjusted or set accordingly.

At block 930, a payout program is created. In one embodiment, the payout program is created in-plan—meaning without a transfer of custody of the investor's portfolio assets. In other embodiments, the payout program may be created by a third party service provider that takes custody of all or some portion of the investor's portfolio assets.

At block 940, periodic payouts, funded by the annuity-like stream of income created by the payout program, are paid to the investor. For example, in the context of an in-plan payout program, a third party advisor or sub-advisor making use of an advisory service (e.g., advisory service 630) may provide distribution instructions to a recordkeeper (e.g., recordkeeper 620) regarding annual payments to be made to the investor.

Note that as implied by the exemplary nature of the flow diagrams described herein, there is no requirement that the steps be performed in the particular order presented or described. Furthermore, it will be appreciated by those skilled in the art that some steps may be omitted, and other steps can be added where relevant to the particular implementation.

Figure 10:
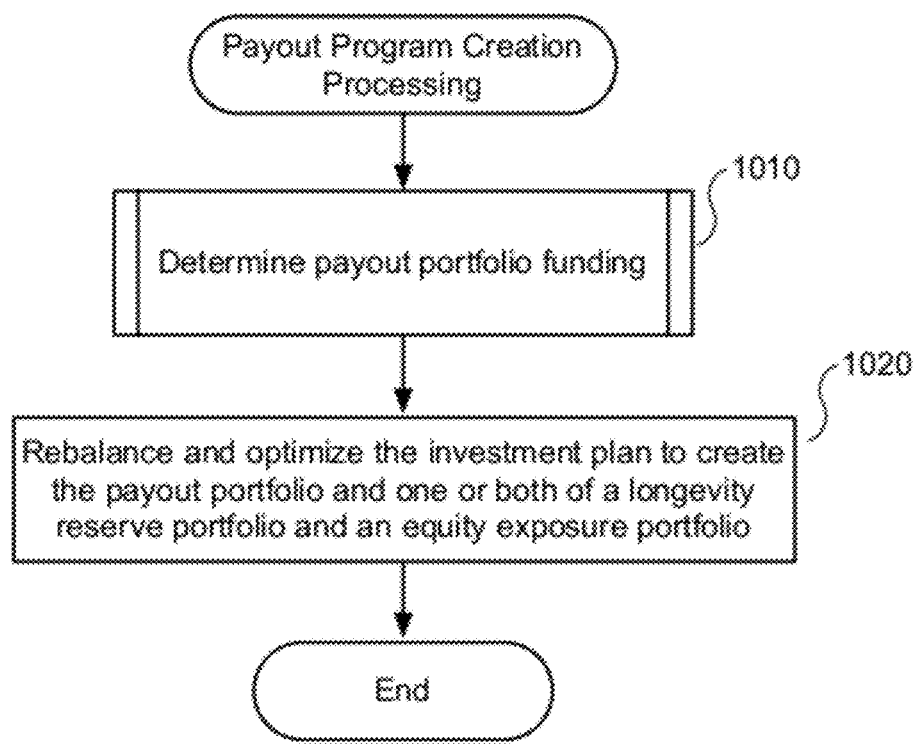
FIG. 10 is a flow diagram illustrating payout program creation processing in accordance with an embodiment of the present invention.

FIG. 10 is a flow diagram illustrating payout program creation processing in accordance with an embodiment of the present invention. At block 1010, based on a predetermined, derived or configurable periodic cash payout, a determination is made regarding how to fund the periodic cash payouts from a payout portfolio (e.g., a portion of the investor's investment portfolio) for a defined time horizon (e.g., from the time of retirement until the investor turns 85).

An exemplary funding algorithm is described in further detail below. For purposes of the present discussion, it is sufficient to note that in accordance with various embodiments of the present invention the output of the funding algorithm is a feasible and actionable recommended payment portfolio having a present expectation of being able to sustain the periodic cash payouts for the horizon. According to one embodiment and as described in further detail below, investment portfolio assets allocated to the payout portfolio are modeled as baskets of CMTs, but rebalancing directives are provided in terms of dollar values or relative weightings of funds capable of being purchased within the context of the investment plan at issue. For example, the output of the funding algorithm may be (i) a vector or list of funds that are available for purchase by the investor within the context of the investment plan at issue and (ii) a corresponding vector or list of weights indicating the proportion of recommended holdings in the fund relative to the total assets of the investment portfolio.

At block 1020, the investment portfolio is rebalanced and optimized to create the payout portfolio and one or both of a longevity reserve portfolio and an equity exposure portfolio. As described earlier, according to one embodiment of the present invention, at the time of retirement (e.g., age 65), 65% of the total value of the investor's retirement investment portfolio assets is allocated to the payout portfolio, 20% of the total value is allocated to the equity exposure portfolio and 15% of the total value is allocated to the longevity reserve portfolio. Thereafter, as a result of payouts being made from the payout portfolio and use of the equity exposure portfolio to fund increases, if any, in spending, the payout portfolio and the equity exposure portfolio gradually decrease as a percentage of total retirement investment plan assets and the longevity reserve portfolio gradually increases as a percentage of total retirement investment plan assets. According to one embodiment, by the time the investor is age 85, the payout portfolio has evolved to 100% longevity reserve—the entirety of which is meant to be used to purchase an immediate annuity.

As the present disclosure is focused primarily on funding an annuity-like stream of income for a particular horizon, a detailed discussion regarding portfolio optimization is beyond the scope of this disclosure. As is well-known to those skilled in the art, there are numerous portfolio optimization approaches available—any number of which would be suitable for use. For information regarding a portfolio optimization approach implemented by the assignee of the present invention, see U.S. Pat. No. 7,016,870, which is hereby incorporated by reference in its entirety for all purposes.

Figure 11:
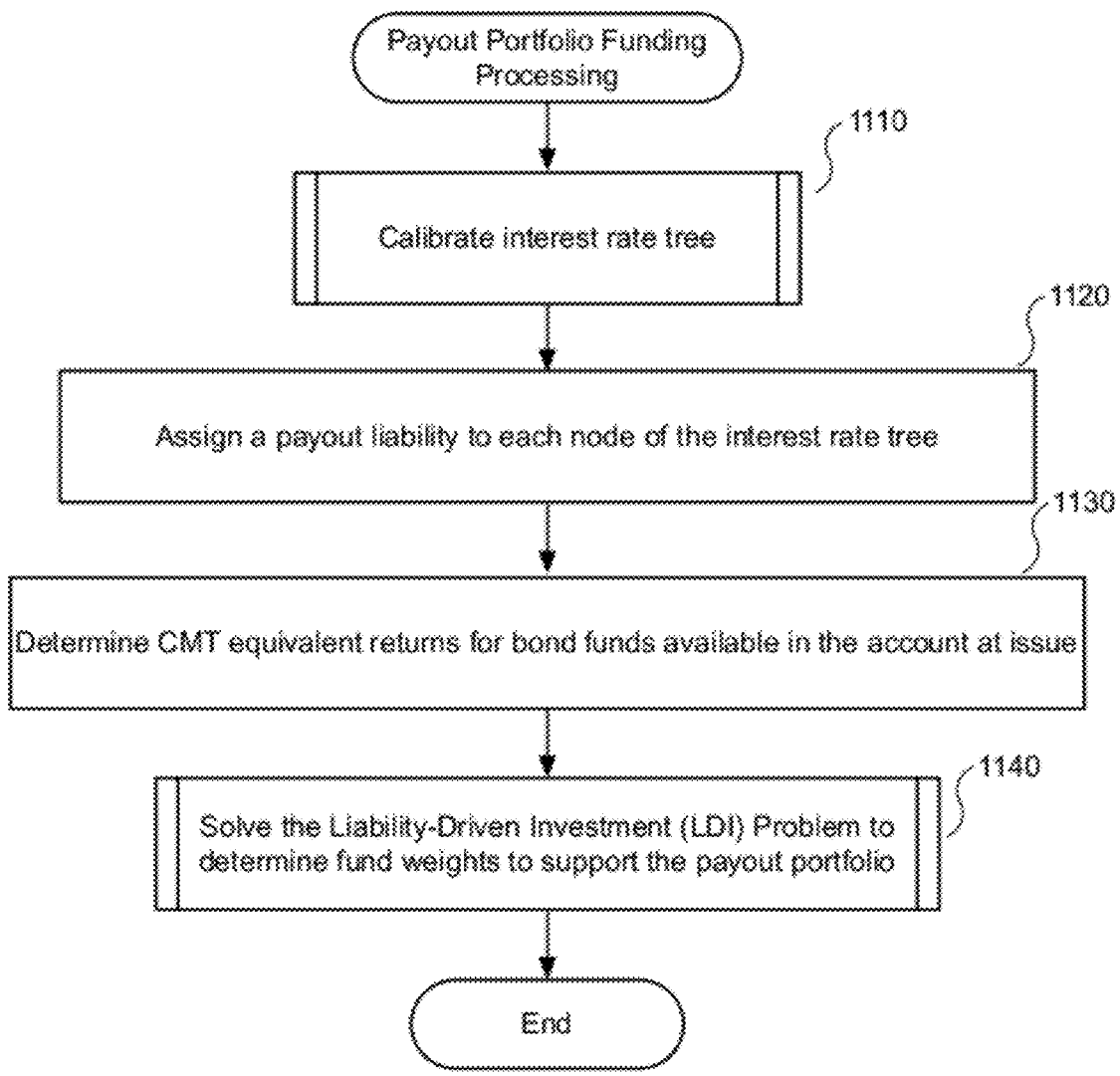
FIG. 11 is a flow diagram illustrating payout portfolio funding processing in accordance with an embodiment of the present invention.

FIG. 11 is a flow diagram illustrating payout portfolio funding processing in accordance with an embodiment of the present invention. At block 1110, an interest rate tree is calibrated. According to one embodiment, the interest rate tree is based on a short-rate tree model as described in (i) Luenberger, D. G. (1998), *Investment Science*, Oxford University Press, Oxford, UK, Chapter 14 and (ii) Hull, J. C. (2003), *Options, Futures, and Other Derivatives*, 5th Edition, Prentice Hall, Upper Saddle River, N.J., Chapters 23-24, which are hereby incorporated by reference in their entirety for all purposes. For completeness, a non-limiting example of an algorithm for calibrating an interest rate tree is described further below with reference to FIG. 13.

At block 1120, a payout liability is assigned to each node of the interest rate tree. According to one embodiment, the payout liability assigned to a particular node represents the unitized payout to be paid at the time step at which the particular node occurs. In embodiments in which an annuity is to be purchased by the investor at the end of the horizon, the payout liability for the nodes one time period prior to the node corresponding to the horizon is set to the projected unitized annuity price (e.g., the projected unitized age-85 annuity price).

At block 1130, CMT equivalent returns for bond mutual funds available in the investment plan at issue are determined. As noted above, in one embodiment, the CMT equivalent return of an investment plan asset is the weighted sum of its component CMT returns, adjusted for fees. According to one embodiment, each node in the tree is assigned a target payout amount (in the above examples it would be L dollars for each node prior to year T and L*A dollars for each node which occurs at year T).

According to one embodiment, the optimization process begins at the end of the tree and works backwards (T–1, T–2, etc.) to the beginning of the tree. For each time step, the optimization process determines the cost of providing for all payouts that occur during the next year. The process ends when it reaches the beginning of the tree and has thus determined the cost of providing for all the payouts on the tree. For example, any node at time T–1 is responsible for funding $L at time T–1 and L*A dollars at two (or more) future nodes at time T. The ideal instrument to fund the 1-year future liability would be a 1-year zero coupon bond as no matter what happens to interest rates, a zero coupon bond investment will deliver the desired $L*A. If a 1-year zero coupon bond were available at time T–1, then its price could be used to determine how much money is needed at each T–1 node. In 401(k) plans, the ideal investment is rarely available. In this case, investments are generally subject to interest rate risk. Given this reality, in one embodiment, a determination is made regarding the minimum funding required so that even if interest rate changes result in lower returns, the payout portfolio still has sufficient value to cover the $L*A liability. This illustrates the general point that with imperfect investments, the objective is to find the minimum cost required to support a future payout, and that this minimum cost depends critically on the available investment universe.

Once the minimum cost values are determined at each T–1 node, the same procedure is repeated to generate minimum costs at T–2 to support a $L payout at T–2 and the previously computed minimum costs at each T–1 node. The problem can then be recursively solved until the minimum cost of supporting the entire tree is determined for time t=0. Note, in accordance with embodiments of the present invention, the optimization process not only identifies the minimum cost needed to fund the future payouts, but also identifies the t=0 collection of bond fund investments needed to deliver those payouts at minimum cost.

At block 1140, the Liability-Driven Investment (LDI) problem set up by the assigning of payout liabilities to each node of the interest rate tree is solved. According to one embodiment, the algorithm for solving the LDI problem is "stub-year blind," relying on an integer number of time steps. Because the horizon may fall between nodes, in practice, the algorithm likely will need to be run twice, once with $H_{low}$ and once with $H_{high}$. Then, a convex combination of the two runs can be used for generating actual portfolio weighting guidance. According to one embodiment, the LDI problem may be solved as a sequence of sub-problems, each with its own set of liabilities (though the general mathemathical model discussed above envisions only one subproblem). For example, the LDI problem may include sub-problems containing the liabilities for steps 0 and 1, another for step 2, another for step 3, another for step 4, another for step 5, and a last sub-problem containing the liabilities for steps 6 and greater.

According to one embodiment, the liabilities assigned to the nodes of the interest rate tree can be left very general to support broader applicability of the algorithm. Examples of liabilities could include:

- Solving the $1 payout problem in one fell swoop: set $L_{[i,j]}$ equal to $\$\Delta t$ for all nodes in the tree except for at the final step corresponding to age 85; set the liabilities $L_{[N,j]}$ for these nodes to the projected unitized age-85 annuity price.
- Solving the $1 payout problem in multiple "buckets." For example, a three bucket scenario would involve: (1) setting $L_{[i,j]}$ equal to $\$\Delta t$ for all nodes for steps 0-5, set N=5; (2) setting $L_{[i,j]}$ equal to $\$\Delta t$ for all nodes for steps 6-10 and zero elsewhere, set N=10; (3) setting $L_{[i,j]}$ equal to $\$\Delta t$ for all nodes for steps 11+ except for the final step, in which $L_{[N,j]}$ is set equal to the projected age-85 annuity price at the final step and $L_{[i,j]}$ is set equal to zero elsewhere.
- Pricing an N-period European call option on an m-year bond with strike price K: set $L_{[i,j]}$ equal to zero for all nodes except at step N; set $L_{[N,j]}$ equal to max(0, $Z_{[N,j]}$(m)–K).

Figure 16:
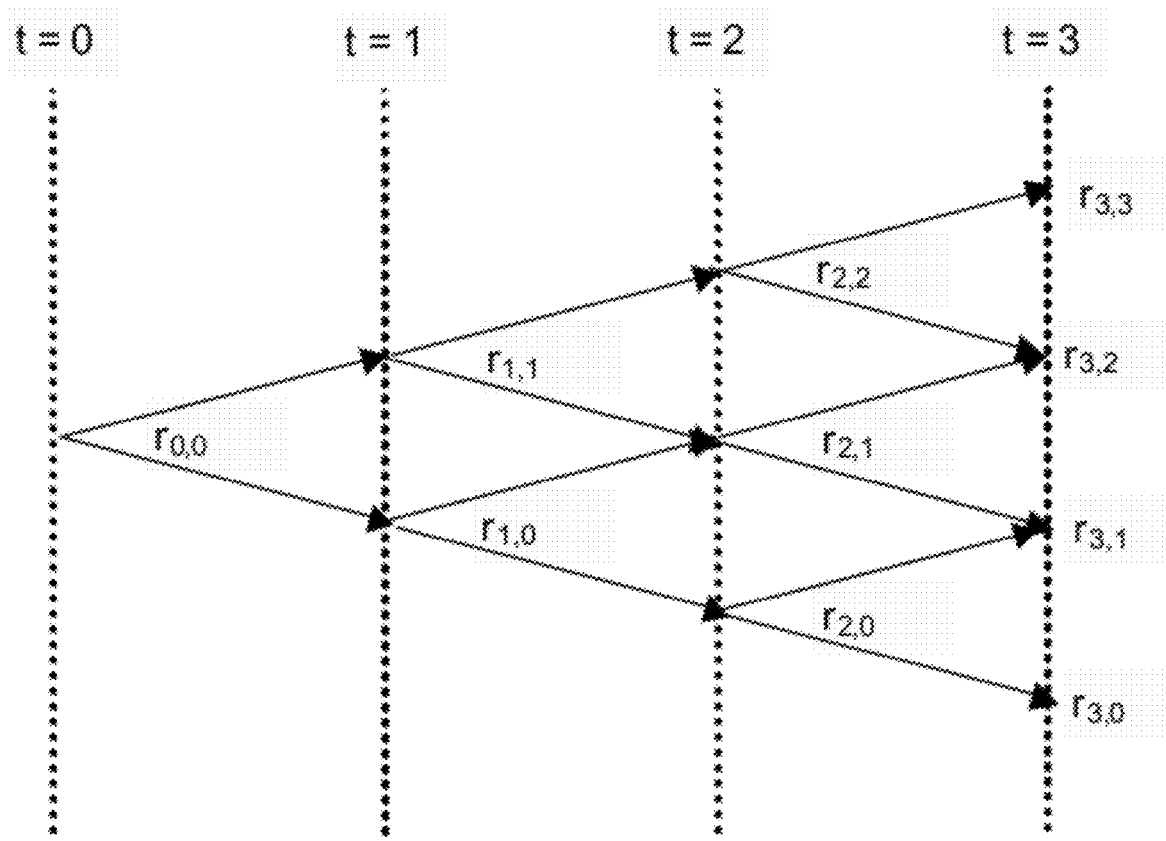
FIG. 16 is a binomial short-rate tree of length three in accordance with an embodiment of the present invention.

In connection with exemplary algorithms described below, the mathematical model may use the following notation:

- [i, j]: a node comprising a state of the world j occurring at time step i. According to one embodiment, time steps are zero-indexed such that "now" is time step 0. Note that step i does not necessarily equal time i. For example, step 4 would correspond to time 1.0 if a quarterly time step is used.
- [i, j]_k: a branch from [i, j] leading to node [i+1, k]. Two short-rate models commonly used with binomial trees are described by (i) Ho, T. S. Y., and S.-B. Lee (1986), "Term Structure Movements and Pricing Interest Rate Contingent Claims," *Journal of Finance,* 41, 1011-1029 and (ii) Black, F., E. Derman, and W. Toy (1990), "A One-Factor Model of Interest Rates and Its Application to Treasury Bond Options," *Financial Analysts Journal,* January-February, 46, 33-39., both of which are hereby incorporated by reference in their entirety for all purposes. In FIG. 16, three years of an annual interest rate tree are depicted in which, every node has two branches: the "down" branch [i, j]_j and the "up" branch [i, j]_j+1 (as in the Ho-Lee model).
- $\Delta t$: the length of time between step i and step i+1. In a quarterly model with uniform time steps, $\Delta t$=0.25 for all i. In various embodiments of the present invention, it is assumed that time steps are of uniform length.
- $r_{[i,j]}$: the short rate at [i, j] used to discount a claim maturing at step i+1, expressed as an annualized, continuously compounded interest rate.
- $d_{[i,j]}$: the one-period discount factor at [i, j], i.e., the price as of [i, j] of $1 to be received at step i+1
- $Z_{[i,j]}$(m): the price at [i, j] of a zero-coupon bond maturing in m years. $Z_{[i,j]}(\Delta t_i) = d_{[i,j]}$
- $R_{[i,j]\_k}$(m): The gross return of an m-year CMT from [i, j] to [i+1, k]
- $R_{f,[i,j]\_k}$: The gross return of fund f, with estimated exposures $\{\beta_f(m)\}$ to m-year CMTs, from [i, j] to [i+1, k]
- $P_{zero}$(r, m): the price of a zero-coupon bond of maturity m priced at a continuously-compounded annual interest rate of r
- $\beta_f$(m): the exposure of fund f to a CMT of maturity m
- $\alpha_f$(m): the "alpha" or idiosyncratic component of the annual expected return of fund f Then, $$R_{[i,j]\_k}(m) = Z_{[i+1,k]}(m - \Delta t) / Z_{[i,j]}(m) \quad (1a)$$

$$R_{f,[i,j]\_k} = \alpha_f + \sum_m \beta_f(m) * R_{[i,j]\_k}(m) \quad (1b)$$

$$d_{[i,j]} = \exp(-r_{[i,j]} * \Delta t) \quad (1c)$$

$$P_{zero}(r, m) = \exp(-r * m) \quad (1d)$$

At each node of the interest rate tree depicted in FIG. 16, the risk-free interest rate applicable for the next year is specified—$r_{t,s}$ is the short-rate at time t and state s, where s is the number of up-moves required to get to the node. For example, the rates for a Ho-Lee model with constant volatility are given by:

$$r_{t,s} = a_t + b \cdot s \quad (1)$$

where the volatility parameter b is specified, and the drift parameters $a_1, a_2, \ldots$ are chosen to fit the current term-structure. The risk-neutral pricing formula relates the value of an interest-rate security at any node to its payout at that node and its values at its two successor-nodes:

$$V_{t,s} = D_{t,s} \cdot (V_{t+1,s} + V_{t+1,s+1})/2 + P_{t,s} \quad (2a)$$

$$D_{t,s} = 1/(1 + r_{t,s}) \quad (2b)$$

where $V_{t,s}$ is the security's value, $P_{t,s}$ is its payout, and $D_{t,s}$ is the discount-rate applied at the node. In equation (2a), the risk-neutral probabilities of up and down moves in the short-rate have been assigned the value one-half.

The price of any t-year zero-coupon bond follows from equations (2), the prescription of the payouts ($1 in every state at time t and zero otherwise), and the termination condition (all values after redemption at time t are zero.) For example, for a two-year zero, $V_{2,0} = V_{2,1} = V_{2,2} = \$1$. Using these values in equations (2), yields: $V_{1,0} = D_{1,0}$ and $V_{1,1} = D_{1,1}$, and after one final iteration the initial price is obtained: $V_{0,0} = \frac{1}{2} \cdot D_{0,0} \cdot [D_{1,0} + D_{1,1}]$.

The return on a t-year CMT is the same as the first-year's return on a t-year zero-coupon bond. For example, $R^d_{0,0}$ the gross return in the down-state for a 2-year bond purchased at time zero is given by $R^d_{0,0} = V_{1,0}/V_{0,0} = 2 \cdot D_{1,0}/(D_{0,0} \cdot [D_{1,0} + D_{1,1}])$. Similarly, $R^u_{0,0}$ the gross return in an up-state is given $R^u_{0,0} = V_{1,1}/V_{0,0} = 2 \cdot D_{1,1}/(D_{0,0} \cdot [D_{1,0} + D_{1,1}])$. For any CMT, the down and up returns $R^d_{t,s}$ and $R^u_{t,s}$ at any initial state (t,s) are easily computed (see FIG. 17). For any interest-rate security, these returns satisfy the risk-neutral pricing formula:

$$R_{t,s}^d + R_{t,s}^u = 2/D_{t,s} = 2 \cdot (1 + r_{t,s}) \quad (3)$$

Again, using the 2-year zero as an example, we have $R^d_{t,s} = 2 \cdot D_{t+1,s}/(D_{t,s} \cdot [D_{t+1,s} + D_{t+1,s+1}])$ and $R^u_{t,s} = 2 \cdot D_{t+1,s+1}/(D_{t,s} \cdot [D_{t+1,s} + D_{t+1,s+1}])$, which satisfy equation (3).

The CMT equivalent return of a 401(k) asset is just the weighted sum of its component CMT returns, adjusted for fees. The simplest fee adjustment is to multiply by one minus the expense ratio. All assets will have a fee adjustment to reflect actual transaction costs and market frictions that are absent from the CMT prices computed via the short-rate tree. In summary, for every asset in a 401(k) plan, in one embodiment, it is assumed that its up and down returns at every node in the short-rate tree is a simple function of the node's CMT returns.

Next, suppose the minimum cost is known for funding the desired payment stream for all possible future states at some time (t+1) in the future. For example, $V_{T,s} = L*A$ for all states.

Now, if one invests an amount $w_j$ in asset j at time t and state s, then these allocations are chosen to minimize the total cost of funding the current payment $P_t$ and all future payments, i.e., $$V_{t,s} = P_t + \min \sum_j w_j \quad (4a)$$

$$w_j \geq 0 \quad (4b)$$

$$\sum_j w_j \cdot R_{t,s}^{u,j} \geq V_{t+1,s+1} \quad (4c)$$

$$\sum_j w_j \cdot R_{t,s}^{d,j} \geq V_{t+1,s} \quad (4d)$$

In equations (4c) and (4d), a superscript j is used to label the up and down returns of the j-th asset. These two inequalities require that the choice of investments cover the costs of funding future payments. Equation (4b) forbids short-positions. If the minimum costs are known in all states at time (t+1), then equations (4) can be used to compute the minimum costs at time t for all states. Since the minimum costs at time T are known, backwards iteration can be used to find the cost at time zero and the initial portfolio of assets needed to be held to achieve the minimum. In short, the minimum funding problem—a dynamic programming problem—can be solved using Richard Bellmann's approach.

In one embodiment, a trinomial tree may be used. A node of a trinomial tree has three possible successor nodes versus a binomial tree's two. The algorithm above is easily modified to accommodate the extra node. First, the risk-neutral pricing formula, equation (2a), acquires a third value on the right side and a new set of risk-neutral probabilities. Similarly, the linear program, equations (4), acquires an additional return constraint.

Figure 12:
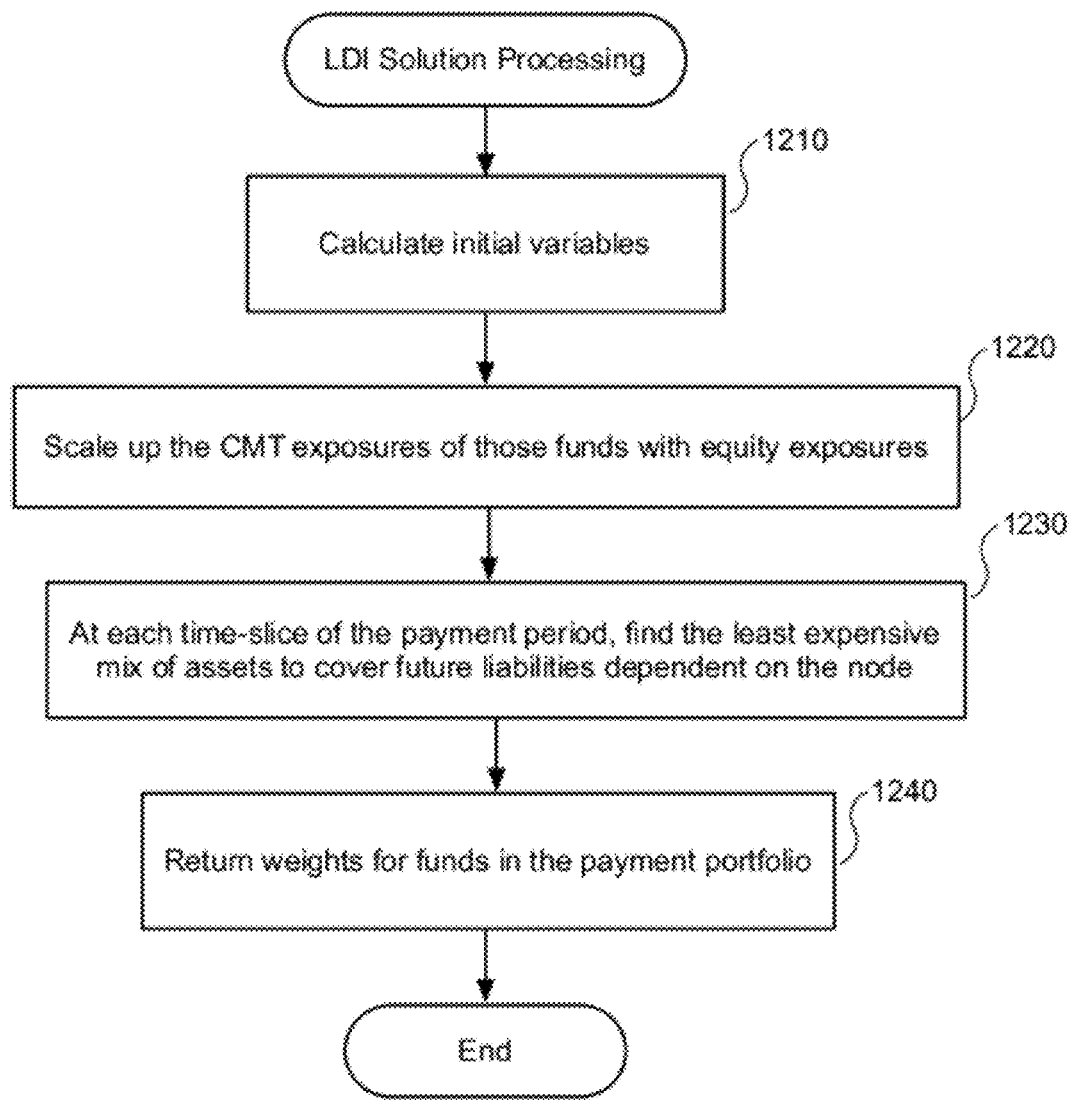
FIG. 12 is a flow diagram illustrating Liability-Driven Investment (LDI) solution processing in accordance with an embodiment of the present invention.

FIG. 12 is a flow diagram illustrating Liability-Driven Investment (LDI) solution processing in accordance with an embodiment of the present invention. According to one embodiment, parameters of the LDI solution algorithm include the following:

| Input/Output parameter name | Description/Units |
|---|---|
| $\{[i,j]\}, \{[i,j]\_k\}, \Delta t$ | The sets of nodes and branches between nodes and time step length. Units: None |
| $L_{[i,j]}$ | The liability associated with node [i, j]. Units: None |
| $F_t$ | The floor-to-total account wealth fractions, indexed by time. It is expected that $0 \leq F_t \leq 1 \; \forall \, t$. Units: None |
| H | Horizon Units: Years |
| Fee | Annual program fee paid by the participant (e.g. 0.0050 for 50 basis points) Units: 1/Year |
| $\gamma$ | Selection sigma adjustment parameter (e.g. 2/3) Units: None |
| $\sigma_{no\_penalty}$ | Selection sigma adjustment parameter (e.g. 0.01) Units: 1/√Year |

-continued

| Input/Output parameter name | Description/Units |
|---|---|
| alpha_retirement$_f$ | Annual predicted alpha for fund f Units: 1/Year |
| $\sigma_f^{retirement}$ | Annual selection volatility for fund f Units: 1/√Year |
| $x_f(m)$ | Weights on CMTs for fund f, m = 0, 1, . . . , 30. $x_f(0)$ represents the weight on cash. Units: None |
| $z_f(GAC)$ | Weights on non-bond generalized asset classes (GACs). It is expected that $$\sum_m x_f(m) + \sum_{GAC} z_f(GAC) = 1$$ Units: None |
| {eGAC} | The set of non-bond generalized asset classes. Units: None |
| $Z_{[i,j]}(m)$ | Zero-coupon bond prices across states and maturities. Units: None |
| Initial Funding, I | The amount of money needed to fund a $1 payment. Units: Dollars |
| Initial Portfolio, $\chi$ | A vector of portfolio weights for the portfolio. Units: Percentage |

At block 1210, initial variables are calculated. For example, the number of time steps in the LDI problem N, the investment plan and/or other program fees 'fee' to be paid at each time step, and the fund alphas $\alpha_f$ to be "earned" at each time step for each fund f, $N=(H/\Delta t)+1$. The "+1" reflects the fact that the tree starts with step 0.

$$t_i = i\Delta t.$$

$$fee = Fee * \Delta t$$

$$\alpha_f = \left( \text{alpha\_retirement}_f - \frac{\gamma \max(\sigma_f^{retirement} - \sigma_{no\_penalty}, 0)}{\sqrt{\max(D_f, 1.0)}} \right) \Delta t$$

$D_f$ is the fund duration, calculated as follows:

$$D_f = \frac{\dfrac{x_f(0)}{12} + \sum_{m>0} m x_f(m)}{\sum_m x_f(m)},$$

as the duration of cash (m=0) is considered to be 1/12.

In practice, this formulation means that $\alpha_f$ will be uniform across time steps i.

At block 1220, the CMT exposures of those funds with equity exposures are scaled up to put such funds on an equal footing with pure CMT funds (like money market funds). According to one embodiment, the scaled CMT exposures for each fund f are calculated as follows, collapsing the weights on maturities less than or equal to $\Delta t$:

$$\beta_f(m) = \frac{\sum_{q=0}^{m} x_f(q)}{\sum_n x_f(n)} \text{ for } m = \Delta t,$$

$$\beta_f(m) = \frac{x_f(m)}{\sum_n x_f(n)} \text{ for } m > \Delta t, \text{ and}$$

$$b_f = \sum_{\{eGAC\}} z_f(eGAC).$$

One can think of $(1-b_f)$ as the fraction of the investor's wealth in fund f in "CMT dollars."

At block 1230, the least expensive mix of assets to cover future liabilities dependent on the node is determined at each time-slice of the payout period. According to one embodiment, this process begins at the penultimate step, N−1 and works backwards.

For every state j at step N−1 with branches [N−1,j]_k, the problem is to ensure adequate funding exists to meet the cost of the liability $L_{[N,k]}$ at step N. If H corresponds to the investor's 85$^{th}$ birthday, then $L_{[N,k]}$ is expected to be the unitized cost of the age-85 annuity at the particular state. According to one embodiment, the problem is expressed as follows:

Find the wealth $w_f$ for each fund f that solves the following problem:

$$\min \sum_f (1 - b_f) w_f$$

subject to:
(no-short constraint) $w_f \geq 0 \ \forall f$, and
(liability coverage constraint)

$$\sum_f (1 - b_f) w_f * (R_{f,k} - fee_{N-1}) \geq L_{[N,k]} \forall k,$$

(equity reserve constraint)

$$F_{t_{N-1}} \sum_f w_f b_f \leq (1 - F_{t_{N-1}}) \sum_f w_f (1 - b_f)$$

where from equation (1b), $$R_{f,k} = \alpha_f + \sum_m \beta_f(m) * R_{[N-1,j]\_k}(m)$$

and where the floor-to-total account wealth fractions, $F_t$, may be calculated as further described below.

Let the "solution"

$$S_{[N-1,j]} = L_{[N-1,j]} + \sum_f (1 - b_f) w_f.$$

The solution is the store of CMT wealth necessary to cover the cost of meeting the final liability (e.g., unitized annuity purchase) at step N as well as the cash flow liability at step N−1.

The problem can now be solved recursively backward to step 0. For every state j at step i, solve the general problem:

$$\min \sum_f (1 - b_f) w_{f,[i,j]}$$

subject to:
$w_{f,[i,j]} \geq 0 \ \forall f$, and $$\sum_f (1 - b_f) w_f * (R_{f,[i,j]\_k} - fee_{h-1}) \geq S_{[i+1,k]},$$

using equation (1b), and $$F_{t_i} \sum_f w_f b_f \leq (1 - F_{t_i}) \sum_f w_f (1 - b_f)$$

Then the wealths $\{w_{f,[i,j]}\}$ thus calculated can be used to set $$S_{[i,j]} = L_{[i,j]} + \sum_f (1 - b_f) w_{f,[i,j]}.$$

At block 1240, the weights for funds in the payment portfolio are returned. According to one embodiment, the cost of providing the cash flow stream in "CMT dollars" is $S_{[0, 0]}$. This may not be the "true" cost, as it neglects the non-CMT dollar wealth required; however, it does represent the "floor" cost of covering the liabilities and as such, it will now be referred to it as I. The allocations to the different funds $\{\chi_f\}$, expressed as account fractions of the "floor" portfolio, are as follows:

$$\chi_f = \frac{(1 - b) w_{f,[0,0]}}{I}$$

In one embodiment, a unique approach is taken with respect to bond funds, which takes into consideration the non-CMT component by treating a fund with both non-bond (e.g., equity) and bond exposures as essentially two separate funds. In this manner, the non-bond portions of funds in the payment portfolio may be accounted for by simply considering them a part of the equity exposure portfolio.

Figure 13:
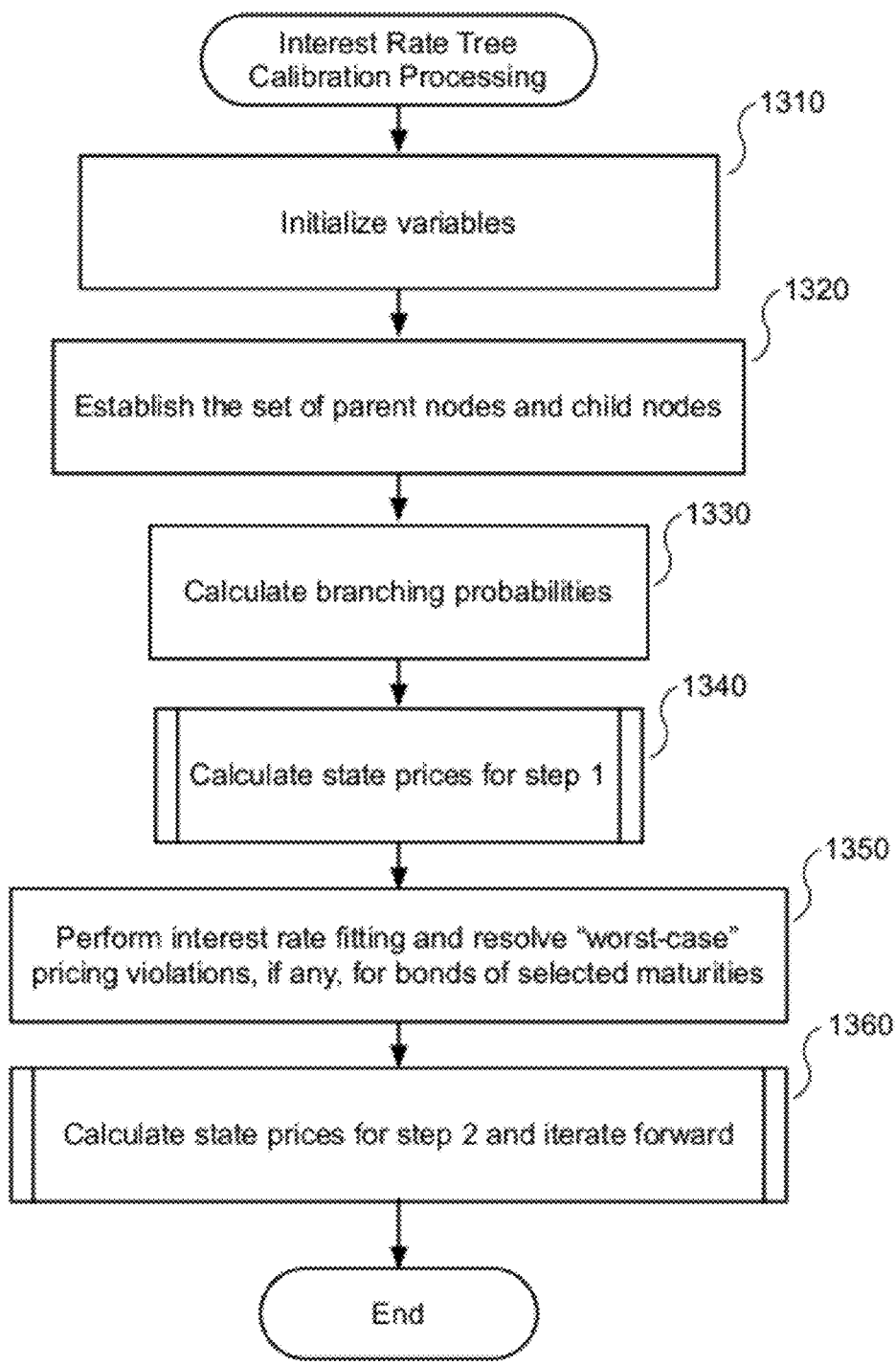
FIG. 13 is a flow diagram illustrating interest rate tree calibration processing in accordance with an embodiment of the present invention.

FIG. 13 is a flow diagram illustrating interest rate tree calibration processing in accordance with an embodiment of the present invention. According to one embodiment, parameters of the interest rate tree calibration processing include the following:

| Input/Output parameter name | Description/Units |
|---|---|
| Δt | Time step length<br>Units: None |
| H | Horizon<br>Units: Years |
| $\sigma_0$ | Initial interest rate change volatility parameter<br>Units: 1/√Year |

-continued

| Input/Output parameter name | Description/Units |
|---|---|
| a | Mean reversion parameter Units: None |
| {$P_{max}(m)$} | The set of maximum, "worst case" prices allowed in the interest rate tree for a given set of maturities {m} Units: None |
| {Y(m)} | Current "spot curve" of interest rates used to calibrate the model Units: None |
| { i, j, r[i, j]} | The set of time step/state/ short rate tuples Units: None |
| { i, j, k, p[i, j]_k } | The set of time step/state/ child state/probability tuples Units: None |

According to one embodiment, the initial interest rate change volatility parameter s0 may be set, in basis points, using the following expression, where f(m) is the forward rate at time zero on a Δt-maturity instrument m years into the future and J is the maximum number of "down" states from state 0 at step Δt*14:

$$\sigma_0 = \min\left[\frac{500}{J\sqrt{3}}, \max\left(\frac{100}{J}, \frac{f(14) - 350}{J\sqrt{3}}\right)\right]$$

According to one embodiment, except for a few calibration details, the tree-building procedure generally follows that described by Hull in Hull, John C. (2009), *Options, Futures, and Other Derivatives, 7th Edition*, Prentice Hall, Upper Saddle River, N.J., Chapter 30, which is hereby incorporated by reference in its entirety for all purposes.

At block 1310, internal variables used for interest rate tree calibration are initialized. For example, the number of time steps in the tree, h, may be set to 1+H/Δt and the short rate for the first time step and first state, $r_{[0,0]}$, may be set to Y(Δt).

At block 1320, the set of parent nodes and child nodes are established. According to one embodiment, the interest rate tree is a recombining trinomial tree with time steps of uniform length Δt. For example, each node may have three branches and three different branching configurations may be used:

up/middle/down ("u/m/d"): the standard branching
up2/up1/middle ("uu/u/m"): branching at the bottom edge of a pruned tree
middle/down1/down2 ("m/d/dd"): branching at the top edge of a pruned tree The state index, j, is set according to the following:

At i=0,j=0. The standard u/m/d branching will apply, leading to . . . .
. . . at i=1, state indices of 1/0/−1, respectively. At [1, 0], the standard u/m/d branching applies, leading to a zero state at step 2 by way of the middle branch.
In this way, there will exist a state 0 for any particular time step. For "up" states from state 0 within the same time step, j is set to the positive integer measuring the distance (in states) from state 0. Likewise, for "down" states from state 0 within the time step, j is set to a corresponding negative integer.
This leads to the following step/state/child state tuples through step 1:

TABLE 2

Step/State/Child State Tuples Through Step 1

| Step | state | child_state |
|---|---|---|
| 0 | 0 | 1 |
| 0 | 0 | 0 |
| 0 | 0 | −1 |
| 1 | 1 | 2 |
| 1 | 1 | 1 |
| 1 | 1 | 0 |
| 1 | 0 | 1 |
| 1 | 0 | 0 |
| 1 | 0 | −1 |
| 1 | −1 | 0 |
| 1 | −1 | −1 |
| 1 | −1 | −2 |

From Table 2, above, one can see that there are three branches leading to [2, 0]: [1, 1]_0, the "down" branch from [1, 1]; [1, 0]_0, the "middle" branch from [1, 0]; and [1, −1]_0, the "up" branch from [1, −1].

At block 1330, the branching probabilities are calculated. According to one embodiment, for the standard "u/m/d" branching, the probabilities of experiencing the different branches are set as follows:

$$p_u = p_{[i,j]\_j+1} = \frac{1}{6} + \frac{1}{2}(a^2 j^2 \Delta t^2 - aj\Delta t)$$

$$p_m = p_{[i,j]\_j} = \frac{2}{3} - a^2 j^2 \Delta t^2$$

$$p_d = p_{[i,j]\_j-1} = \frac{1}{6} + \frac{1}{2}(a^2 j^2 \Delta t^2 + aj\Delta t)$$

These probabilities are positive for positive j:

$$\frac{0.184}{a\Delta t} < j < \frac{0.816}{a\Delta t}$$

and for negative $j \frac{-0.816}{a\Delta t} < j < \frac{-0.184}{a\Delta t}$.

If j does not obey these bounds, then the nonstandard branchings are employed. For "uu/u/m" branching, the probabilities are set as follows:

$$p_{uu} = p_{[i,j]\_j+2} = \frac{1}{6} + \frac{1}{2}(a^2 j^2 \Delta t^2 + aj\Delta t)$$

$$p_u = p_{[i,j]\_j+1} = -\frac{1}{3} - a^2 j^2 \Delta t^2 - 2aj\Delta t$$

$$p_m = p_{[i,j]\_j} = \frac{7}{6} + \frac{1}{2}(a^2 j^2 \Delta t^2 + 3aj\Delta t)$$

And, for "m/d/dd" branching, $$p_m = p_{[i,j]\_j} = \frac{7}{6} + \frac{1}{2}(a^2 j^2 \Delta t^2 - 3aj\Delta t)$$

$$p_d = p_{[i,j]\_j-1} = -\frac{1}{3} - a^2 j^2 \Delta t^2 + 2aj\Delta t$$

$$p_{dd} = p_{[i,j]\_j-2} = \frac{1}{6} + \frac{1}{2}(a^2 j^2 \Delta t^2 - aj\Delta t)$$

Assuming $\alpha=0.1$, Table 2 can be filled with probabilities as follows:

TABLE 3

Table 2 + Probablities

| step | state | child_state | prob |
|---|---|---|---|
| 0 | 0 | 1 | 0.166667 |
| 0 | 0 | 0 | 0.666667 |
| 0 | 0 | -1 | 0.166667 |
| 1 | 1 | 2 | 0.121667 |
| 1 | 1 | 1 | 0.656667 |
| 1 | 1 | 0 | 0.221667 |
| 1 | 0 | 1 | 0.166667 |
| 1 | 0 | 0 | 0.666667 |
| 1 | 0 | -1 | 0.166667 |
| 1 | -1 | 0 | 0.221667 |
| 1 | -1 | -1 | 0.656667 |
| 1 | -1 | -2 | 0.121667 |

At block 1340, the state prices are calculated for step 1. According to one embodiment, the state prices are calculated using the methodology described with reference to FIG. 14.

At block 1350, interest rate fitting is performed and "worst case" pricing violations, if any, for bonds of selected maturities are resolved. In one embodiment, this involves setting $\sigma_1 = \sigma_0$, calculating, $r_{[1,1]}, r_{[1,0]}$, and $r_{[1,-1]}$ such that equation (5d), below, is satisfied for i=1. In some embodiments, it is checked as to whether equation (5e), below, is satisfied for selected maturities. If not, set $\sigma_1 = 0.95 \sigma_0$ and recalculate $r_{[1,1]}, r_{[1,0]}$, and $r_{[1,-1]}$ such that equation (5d) is satisfied for i=1. Check that equation (5e) is satisfied for selected maturities. If not, keep reducing $\sigma_1$ by $0.05\sigma_0$ until (5e) holds.

Continuing with the earlier examples, in which [i, j] represents a node in the tree at time step i, state j, according to one embodiment, interest fitting for time $t_i$ at step i may proceed as follows:

$$t_i = i\Delta t \quad (5a)$$

Given some volatility parameter $\sigma_i$, a general method for setting short rates at time step i is to find some $\mu_i$ such that the short rate $r_{[i,j]}$ for each node [i, j] is set by the following expressions:

$$r_{[i,j]} = \mu_i + j\Delta r_i, \text{ where} \quad (5b)$$

$$\Delta r_i = \sigma_i \sqrt{3\Delta t}, \text{ and} \quad (5c)$$

$$Z_{[0,0]}(t_{i+1}) = P_{zero}(Y(t_{i+1}), t_{i+1}). \text{ See equation (1d).} \quad (5d)$$

Equation (5d) articulates a core condition for calibration in accordance with an embodiment of the present invention, namely, the yield curve recovered from the interest rate tree must match the yield curve observed in the marketplace. In some embodiments, additional conditions may be imposed on the choice of short rates to the effect that forward-looking pricing of bonds of selected maturities can not exceed "worst-case" pricing. The Hull-White model allows for analytical pricing of bonds using the various pricing parameters ($\alpha$, $\sigma_i$) and the short rate available at time $t_i$ (alternatively, one can just construct the tree forward with the volatility fixed thereafter and use the tree for pricing). Exemplary additional conditions are expressed in equation (5e) and below.

$$\Phi_{[i,j]}(m) \leq P_{max}(m), \quad (5e)$$

for all $j$, $m$, where, for each $m$, $$T = t_i + m, \quad (5f)$$

$$\Phi_{[i,j]}(m) = A(t_i, T)\exp(-C(t_i, T)r_{[i,j]}), \quad (5g)$$

$$C(t_i, T) = \frac{B(t_i, T)}{B(t_i, t_i + \Delta t)}\Delta t, \quad (5h)$$

$$B(t_i, T) = \frac{1 - \exp(-a(T - t_i))}{a}, \quad (5j)$$

and $$\ln A(t_i, T) = \quad (5k)$$
$$\ln \frac{P_{zero}(Y(T), T)}{P_{zero}(Y(t_i), t_i)} - \frac{B(t_i, T)}{B(t_i, t_i + \Delta t)} \ln \frac{P_{zero}(Y(t_i + \Delta t), t_i + \Delta t)}{P_{zero}(Y(t_i), t_i)} -$$
$$\frac{\sigma_i^2}{4a}(1 - \exp(-2at_i))B(t_i, T)[B(t_i, T) - B(t_i, t_i + \Delta t)]$$

Though equation (5e) should typically hold for all states j, in practice only the most negative j may be required to meet equation (5e) as this state will have the lowest interest rate and, by equation (5g), the highest $\Phi$.

At block 1360, the state prices are calculated for step 2 and calibration processing iterates forward. As indicated above, according to one embodiment, the state prices are calculated using the methodology described with reference to FIG. 14.

Figure 14:
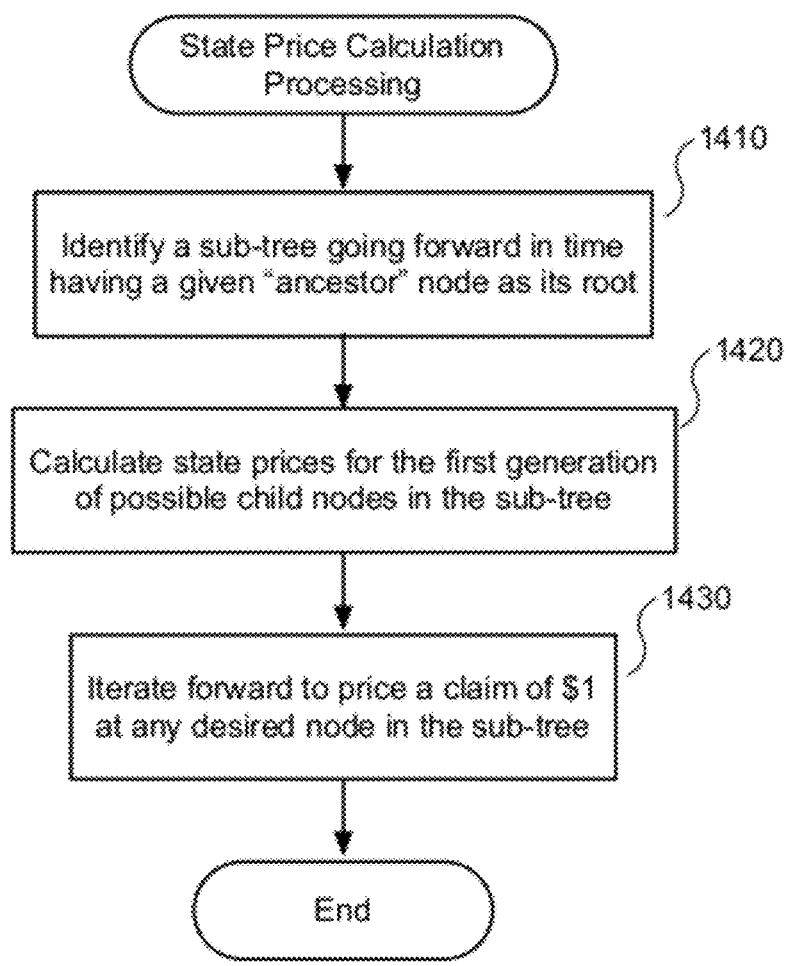
FIG. 14 is a flow diagram illustrating state price calculation processing in accordance with an embodiment of the present invention.

FIG. 14 is a flow diagram illustrating state price calculation processing in accordance with an embodiment of the present invention. According to the present example, state price calculation processing prices a claim of $1 at any node in the tree as of any "ancestor" node. Among other things, the state prices can be used to create future state-contingent yield curves. In the present example, the inputs to the state price calculation processing are essentially the outputs of the interest rate tree calibration processing described above. According to one embodiment, parameters of the state price calculation processing include the following:

| Input/Output parameter name | Description/Units |
|---|---|
| $\{[i,j]\}, \{[i,j]\_k\}, \{\Delta t_i\}$ | The sets of nodes, branches between nodes, and time step lengths<br>Units: None |
| $\{r_{[i,j]}\}$ | The set of node "short rates," expressed as annualized continuously-compounded interest rates.<br>Units: None |
| $\{p_{[i,j]\_k}\}$ | The set of node branch probabilities<br>Units: None |
| i* | As-of time step<br>Units: None |
| j* | As-of state<br>Units: None |
| $\{\iota_{[i^*,j^*]}([x,y])\}$ | The set of state prices of $1 at the beginning of [x, y], priced as of the beginning of [i*, j*]<br>Units: Decimal |

At block 1410, a sub-tree going forward in time having a given "ancestor" node as its root is identified. According to one embodiment, a sub-tree may be built as follows:

Let $\lambda_{[x,y]} = \{[x+1,k]\}$ for $k \in \{[x,y]\_k\}$ fixing time step x and state y. That is, $\lambda_{[x,y]}$ is the set of "child" nodes of [x, y].

Let $\Lambda_{[i,j]}$ be the "sub-tree" of $\{[i,j]\}$ as of node [i, j], the collection of nodes and branches connected to [i, j]. Alternatively, $$\Lambda_{[i,j]} = [i,j] \cup \bigcup_{n=i}^{h-1} \bigcup_{m} \lambda_{[n,m(n)]},$$

where h is the maximum time step m(n) is a state branched from at least one state y in $\{[\lambda_{n-1,y}]\}$.

m(i)=j $\Lambda_{[0,0]} = \{[i,j]\}$. In the Ho-Lee model example, $\Lambda_{[i,j]}$ $$\Lambda_{[i,j]} = \begin{Bmatrix} & & [i+2, j+2], & \\ & [i+1, j+1], & [i+2, j+1], & \\ [i,j], & [i+1,j], & [i+2,j], & \ldots \end{Bmatrix}$$

At block 1420, state prices for the first generation of possible child nodes in the sub-tree are calculated. According to one embodiment, state prices for the first step may be calculated by fixing i* and j*. Then, the risk-neutral value at [i*, j*] of $1 at some node [i*+1, k] is the time value of money from step i* to step i*+1 multiplied by the probability of state k being realized. That is, $$i_{[i^*,j^*]}([i^*+1,k]) = d_{[i^*,j^*]} * p_{[i^*,j^*]\_k},$$

where, from equation (1c), $d_{[i^*,j^*]} = \exp(-r_{[i^*,j^*]} * \Delta t_{i^*})$. $i_{[i,j]}([i,j]) = 1.0$.

At block 1430, state price calculation processing may iterate forward to price a claim of $1 at any desired node in the sub-tree. In one embodiment, $\Omega_{[i,j],[x,y]}$ may be denoted as the set of "parent" nodes of node [x, y] contained in $\Lambda_{[i,j]}$. Then, $$\Omega_{[i,j],[x,y]} = \{[x-1,z]\}$$

for all z such that

[x, y]$\in \lambda_{[x-1, z]}$

[x-1,z]$\in \Lambda_{[i,j]}$.

To cover a $1 claim at some node [x, y] with certainty, one requires adequate wealth at the parent nodes. A risk-neutral investor does not require certainty, merely that the cost will be covered in expectation. Accordingly, in one embodiment of the present invention $$i_{[i^*,j^*]}([x,y]) = \sum_z i_{[i^*,j^*]}([x-1,z]) * d_{[x-1,z]} * p_{[x-1,z]\_y},$$

for all z such that [x-1,z] $\in \Omega_{[i^*,j^*],[x,y]}$.

Figure 15:
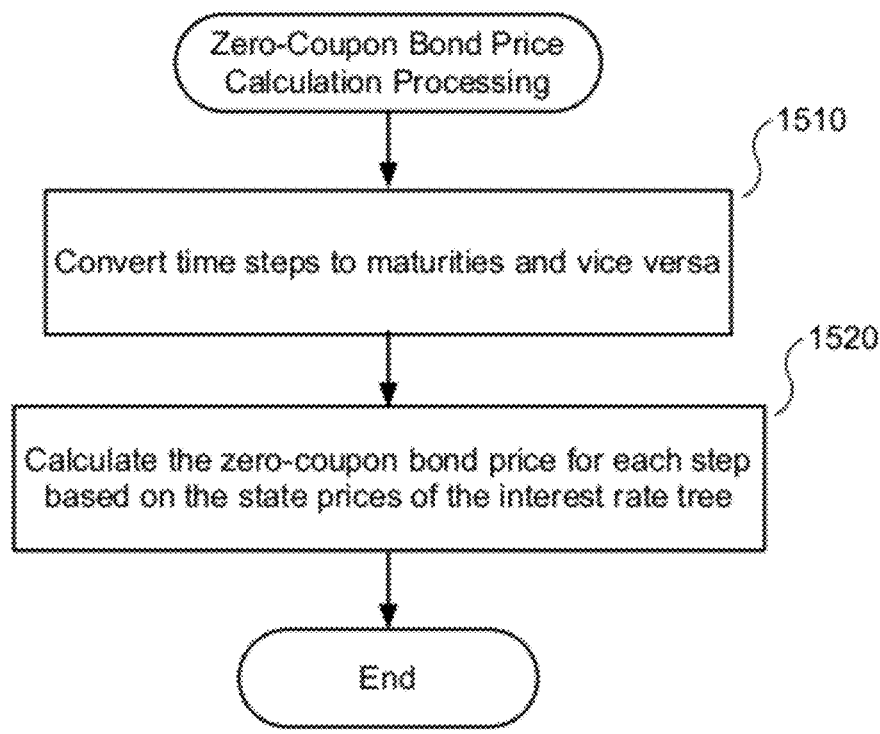
FIG. 15 is a flow diagram illustrating zero-coupon bond price calculation processing in accordance with an embodiment of the present invention.

FIG. 15 is a flow diagram illustrating zero-coupon bond price calculation processing in accordance with an embodiment of the present invention. In the present example, the inputs to the zero-coupon bond price calculation processing are essentially the outputs of the state price calculation processing described above. According to one embodiment, parameters of the zero-coupon bond price calculation processing include the following:

| Input/Output parameter name | Description/Units |
|---|---|
| $\{i_{[i^*,j^*]}([x,y])\}$ | The set of state prices of $1 at the beginning of [x, y], priced as of the beginning of [i*, j*]. This is the output of state price calculation processing described above with reference to FIG. 14. Units: Decimal |
| Z[i, j](m) | The zero-coupon bond prices across states and maturities Units: None |

At block 1510, time steps are converted to maturities and vice versa. In one embodiment, the relationship between a maturity m and the corresponding time step index n(m) is as follows:

$$m = n\Delta t$$

At block 1510, the zero-coupon bond price for each step is calculated based on the state prices of the interest rate tree. According to one embodiment, the formula for a zero-coupon bond of duration m adds up the state prices for all states y in the time step beginning in m years as follows:

$$Z_{[i,j]}(m) = \sum_y i_{[i,j]}([n(m), y])$$

If m falls "between" time steps, then, in one embodiment, an appropriate convex combination of $Z_{[i,j]}(m^+)$ and $Z_{[i,j]}(m^-)$ may be used.

FIG. 16 is a binomial short-rate tree of length three in accordance with an embodiment of the present invention. In one embodiment, a trinomial tree may be used. A node of a trinomial tree has three possible successor nodes versus a binomial tree's two.

Figure 17:
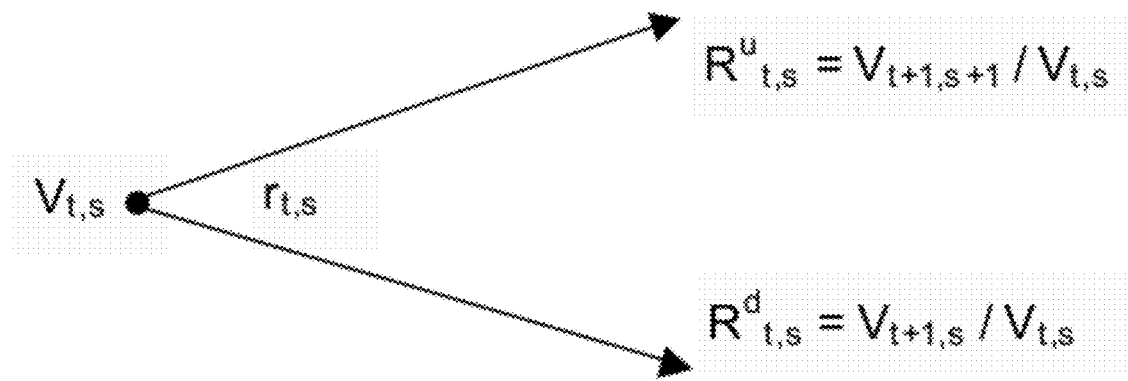
FIG. 17 illustrates the binomial returns at time t and state s in accordance with an embodiment of the present invention.

FIG. 17 illustrates the binomial returns at time t and state s in accordance with an embodiment of the present invention.

Calculating the Floor Fraction 'F'

As noted above in connection with the exemplary LDI solution algorithm, a set of floor-to-total account wealth fractions, indexed by time, $F_t$, may be used in connection with implementing an equity reserve constraint, among other things. According to one embodiment, calculation of F involves the following parameters:

| Input/Output parameter name | Description/Units |
|---|---|
| W | The total unrestricted manageable account wealth at time zero, assumed to be vested Units: Dollars |
| f* | minimum floor fraction Units: None |
| C⁻ | previous payout Units: Dollars |

As preamble, note that for any floor fraction F, the maximum supportable payout C(F) is $$\frac{FW}{I(F)},$$

where I represents the cost in "CMT dollars" of providing $1 of payouts.

Most of the time, C(F) will be an increasing function of F. However, one can construct use cases in which C(F) hits a maximum at some F and declines thereafter. For example, suppose the longest-duration asset in the opportunity set has some corporate bond exposure and hence cannot be purchased when F equals 1.0. At some F, the "pure CMT" funds will crowd out this asset and I(F) may increase faster than F.

Therefore, for a given previous payout level of $C^-$, the task is to find either the minimum F that will sustain such a payout, or, failing that, the F that maximizes $$\frac{FW}{I(F)}.$$

The general process is as follows:

1. Starting at the age-based minimum floor fraction $f_*$, pick some $f_* \leq F_0 \leq 1.0$.
2. For any time step i, set $F_i = \max(F_0, f_{*i})$, where $f_{*i}$ is chosen based on the age corresponding to step i, desired degree of inflation protection, and desired level of confidence that market shocks will not require a downward reset of the payout.
3. Calculate and remember $I(F_0)$, $\chi(F_0)$, and $$\frac{F_0 W}{I(F_0)}.$$

4. If $$\frac{F_0 W}{I(F_0)} \geq C^-,$$

then set $C^+ = C^-$. $C^-$ is said to be "sustainable". Use $I(F_0)$ and $\chi(F_0)$ in to determine the target account rebalance portfolio.

5. Otherwise, increase $F_0$ and go back to step (2). Repeat until either $$\frac{F_0 W}{I(F_0)} \geq C^-$$

or $F_0$ equals 1.0.

6. If $F_0=1.0$ is reached without reaching step (4), then $C^-$ is said to be "unsustainable". Find $\hat{F}$, the F that maximizes $$\frac{FW}{I(F)}.$$

Set $$C^+ = \frac{q\hat{F}W}{I(\hat{F})}.$$

Use $I(\hat{F})$ and $\chi(\hat{F})$ to determine the target account rebalance portfolio.

The quantity q (for example, 0.95) represents the fraction of the theoretically-supportable payout that is used to reset a member's payout when the previous payout is unsustainable. A q of less than 1.0 provides a buffer against repeated downward resets.

Optimizing the Floor Portfolio with the Residual Equity Portfolio

The algorithm above for calculating the floor fraction 'F' uses a quantity $C^+$ described as the "supportable" payout. Note that "supportable" does not necessarily mean "actual". Depending upon the particular implementation, increases to the payout may only occur annually, creating potential windows for which the supportable payout is greater or less than what is actually being paid. Moreover, depending on circumstances, it may be deemed appropriate to continue actual payouts in excess of the theoretical supportable level.

According to one embodiment, calculation of $C^+$ involves the following parameters:

| Input/Output parameter name | Description/Units |
|---|---|
| GAC market weights, $mkt\_wt_i$ | The market weights across generalized asset Units: None |
| Floor Portfolio, $\chi$ | A vector of portfolio weights for the "floor" portfolio. $\chi_f$ is the weight in fund f. $$\sum_f \chi_f = 100\%$$ Units: None |
| W | Wealth in the account: unrestricted, manageable, and assumed to be vested Units: None |
| I | Floor cost of providing $1 payouts for life (from section 3.1, "Pricing Cash Flows of $1") Units: Dollars |
| $C^+$ | The "supportable" payout Units: Dollars |
| $b_f$ | Weight of fund f on equity GACs Units: None |
| Optimized portfolio, x | The optimized account weights. $x_f$ is the weight on fund f. Units: None |

According to one embodiment, calculation of $C^+$ may proceed as follows. Let $y_f$ equal the minimum weight of fund f in the total-account optimization. Then $$y_f = \frac{\chi_f C^+ I}{(1-b_f)W}$$

Note that $\{y_f\}$ will serve as bounds for transactions and accordingly must be compliant for that purposes. That is, if the portfolio optimization is for an account fraction-flavor transaction, $\{y_f\}$ must obey the granularity (typically 1% increments, but sometimes 5%) required for the context.

Then the non-floor-related portfolio weight R can be expressed as $$R = 1 - \sum_f y_f$$

Note that (1−R) is not necessarily the "floor" portfolio weight. The floor portfolio is comprised of "CMT dollars" only.

The market-weighted equity portfolio z across non-bond ("equity") generalized asset classes "eGACs" may then be determined as follows:

$$z_{eGAC} = \frac{mkt\_wt_{eGAC}}{\sum_{\{eGAC\}} mkt\_wt_{eGAC}}$$

The target risk level of the combined account, target_risk, is equal to the risk level of the portfolio of funds and pure equity GAC instruments such that the weight on each fund f is equal to $y_f$ and the weight on each equity GAC instrument $e_{GAC}$ is equal to $z_{eGAC}R$.

Then the allocations to the funds {f} according to a standard optimization problem, constrained as follows:

$$\text{Max } E_p = \sum_f x_f E_f$$

such that
  $risk_p \leq target\_risk$, and
  $x_f \geq y_f$ for all f

Additional Alternatives and Examples

While embodiments of the present invention are described above in the context of generating relatively constant payouts that may be stopped, started, increased or decreased, it is also to be understood that the financial advisory system and payout generation processing described herein can be integrated with other aspects of a person's life and handle an arbitrary pattern of payouts to accommodate such aspects. The mechanism for pricing the arbitrary collection of payouts and the strategy needed to fulfill the desired payout pattern utilizes the previously described methodology. Instead of pricing a level $1 payout, the methodology is used to price a single $1 payout at different horizons. As described previously, these single year payouts can be combined to generate any desired pattern of payouts. In fact, funding a lump-sum annuity payout some years hence is an example of using the single payout methodology. The ability to create arbitrary patterns of payouts could be highly desirable for many retirees. For example, payout generation processing and payout program creation may take into consideration financial circumstances and factors outside of the investment plan at issue to optimize, tailor or otherwise personalize the pattern of payouts. Examples of financial circumstances and factors that might influence the pattern of payouts include, but are not limited to, part-time work during retirement, short-term expenses, the timing of claiming social security benefits by the investor and/or the investor's spouse, required minimum distributions, corporate DB plan distributions and deferrals, the expectation of a lump sum distribution to or by the investor (e.g., a lump some distribution from a defined benefit plan, an inheritance, surrender of an insurance policy having a cash value, a desire on the part of the inventor to bequeath a certain amount of money, etc.).

Figure 18:
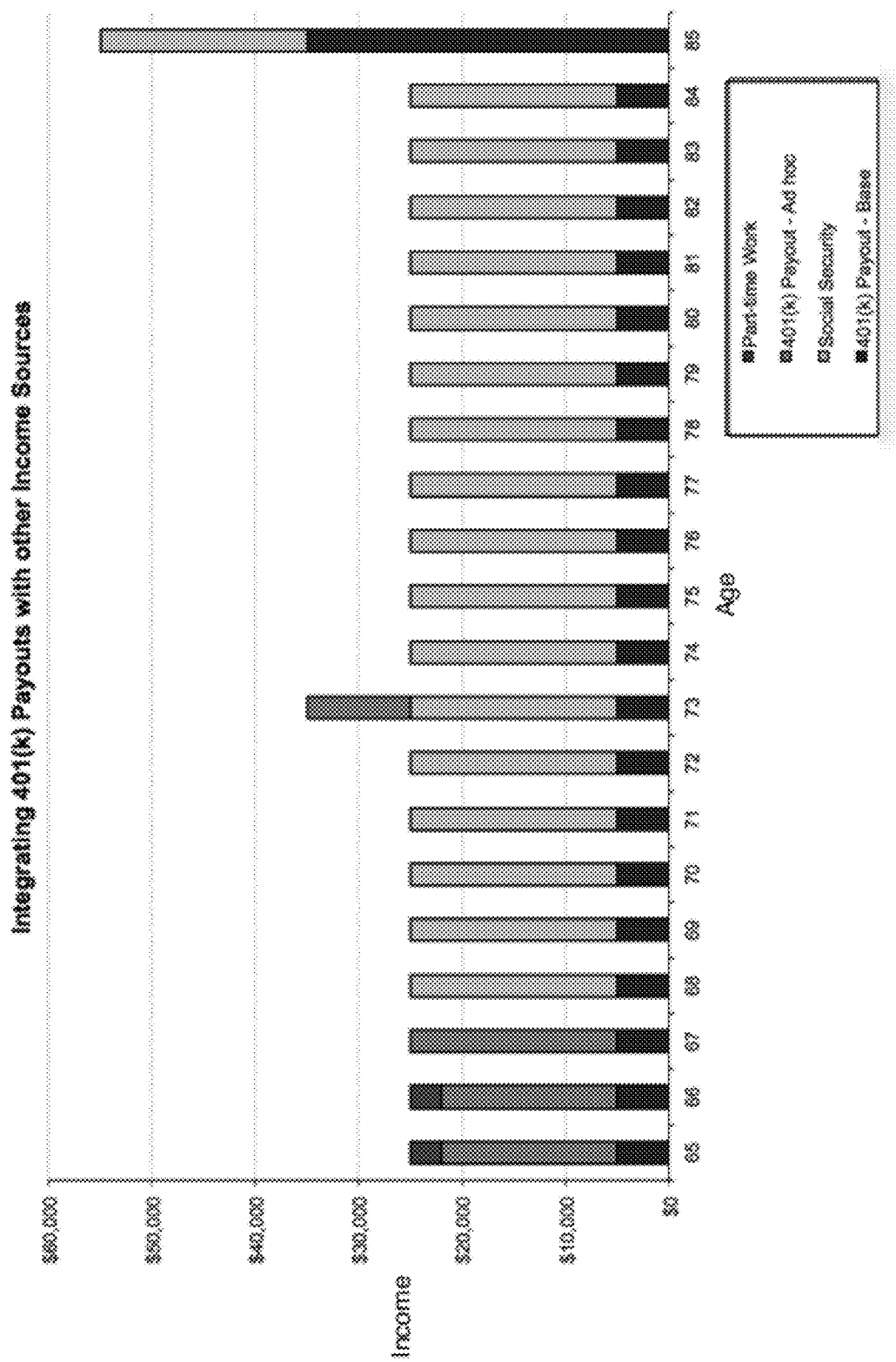
FIG. 18 illustrates payouts for an example scenario with multiple income streams starting and stopping at different dates in accordance with an embodiment of the present invention.

For example, with reference to FIG. 18, consider a 65-year old retiree that wishes to use their 401(k) assets to create steady retirement income of $25,000 per year. However, the retiree would like to delay the start of their Social Security income by three years to age 68. In addition, they plan to maintain a part-time job that will provide income of $3,000 per year for the first two years of their retirement. Finally, they wish to have an extra $10,000 at age 73 available to fund a planned international vacation. FIG. 18, illustrates the set of required payouts to support this retirement income plan. Each year's payout is represented as a colored bar summing to a total of $25,000 per year, with an increased payout of $35,000 at age 73, and a larger payout at age 85 in order to fund the purchase of a fixed immediate annuity, for example, that will maintain the $25,000 per year income for life. Note that the contributions of the 401(k) assets to the income payouts is not uniform. A portion of the 401(k) assets are used to support annual payouts of $5,000 per year in each year of retirement. However, in the first three years, larger ad-hoc 401(k) payouts are used to replace the income not provided by the part-time job and that provided by Social Security once those payments begin at age 68. By structuring the income payouts to level out the overall retirement income at $25,000 per year, the retiree is able to have a desired steady retirement income, while accommodating different start dates for various retirement income sources.

While embodiments of the present invention are described above in the context of seeking to achieve a target income floor, additional or alternative embodiments of the present invention may include:

The ability to lower the floor payouts in exchange for greater upside potential, by adjusting the allocation to equities in the asset portfolio.
 Incorporation of arbitrary patterns of payouts over time (increasing, decreasing, non-monotonic changes)
 The ability to incorporate future lump sum distributions from a DB account into the payout plan, reflecting the impact of future planned cash in-flows.
 The ability to "smooth" lifetime income by filling in for other income sources (DB, Social Security, etc.) with varying start dates. For instance, the retirement income plan may include multiple sources of income starting at different times, with the income portfolio serving to smooth out the payouts during retirement.
 The ability to allow investors to optimize the timing of their Social Security start date to maximize expected lifetime income. For example, an investor may be able to increase their lifetime income by delaying the start of Social Security payments, while using the accumulated retirement assets to provide higher levels of income for the period of time in retirement before the Social Security payments begin.
 The ability to incorporate other sources of income such as part time jobs or spousal income into the payout plan
 Incorporation of a bequeathment preference. For instance, an investor may be able to set aside a portion of assets in a growth-oriented portfolio for possible transfer to their heirs.

- The ability to use levered equity instruments (e.g., levered ETFs) for the equity portion to accommodate investors with higher risk tolerance. This would be possible in retirement accounts that offer access to levered equity products (such as ETFs in an IRA).
- The ability to use the approaches described herein as a backend for target date fund strategies. For instance, a target date fund could be set up to automatically transition assets out of the fund and into the income program over time, so that by the time the investor has retired, they are fully invested in an income-ready portfolio.
- The ability to provide inflation-adjusted payouts through the use of hedging portfolios based on Treasury Inflation-Protected Securities (TIPS) instruments
- The ability to provide steady income payouts from multiple retirement accounts. For instance, applying the above methodology to multiple accounts to create a household retirement payout stream.

While embodiments of the present invention are described above in the context of seeking to achieve the investment objective of creating a sustainable steady stream of payouts throughout retirement, in alternative embodiments, the financial advisory system and payout generation processing may facilitate different optimizations and/or investment objectives. For example, to the extent available within the universe of investments available in the investment plan at issue, TIPS may be used in addition to or in place of bond funds as a means of seeking inflation protection.

In the context of IRAs or other investment plans that permit margin investing, embodiments of the present invention may use leverage on equities in the equity exposure portfolio.

Figure 19:
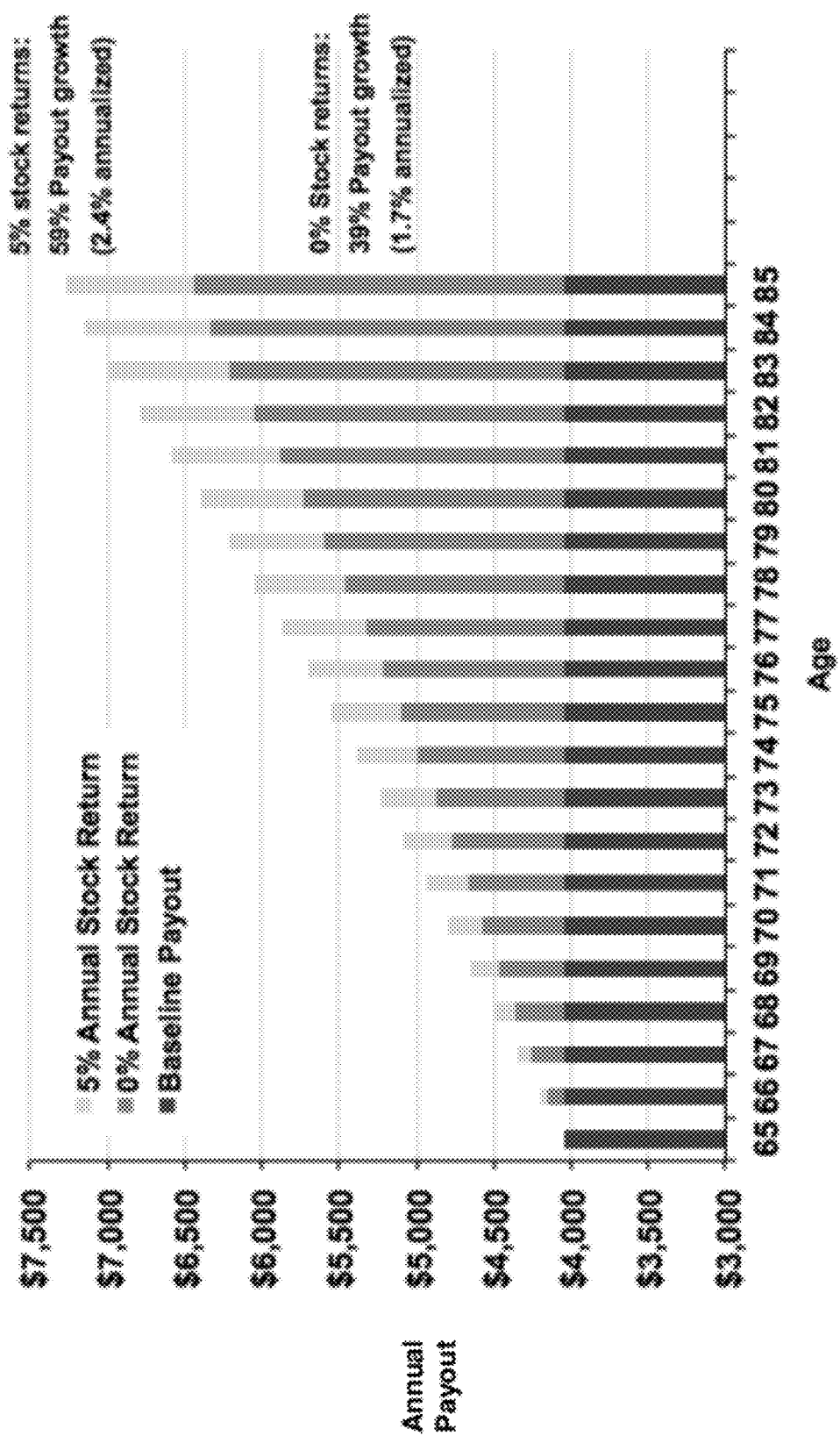
FIG. 19 illustrates payout growth rates under different stock return scenarios in accordance with an embodiment of the present invention.

An additional concrete example is now provided with reference to FIG. 19. These examples make the following assumptions: interest rates evolve consistent with the term structure for U.S. Treasury securities as of Oct. 21, 2010; fixed income and equity investments carry a total fee (program+fund expense ratio) of 80 bps; annuity costs at age 85 are $7 per $1 of lifetime income.

Consider a participating investor that begins the payout program at age 65 with a $100,000 investment. Upon enrollment, the account is split between an $80,000 fixed income portfolio and a $20,000 equity portfolio. In this example, assume that at age 65 every dollar invested in fixed income can support five cents of spending. Thus, spending for this investor begins at $4,000 per year.

Fast forward to age 66. Assume that the stock market has remained flat, but the target value for the equity portfolio has declined to $19,000. If this occurred, then the $1,000 surplus equity would be sold and converted to fixed income. The additional money in fixed income would allow the investor to spend an additional $50 per year in retirement, growing the payout from $4,000 to $4,050 (in fact, spending would be slightly higher since the cost of lifetime income at age 66 is slightly cheaper than at age 65.) In any event, this process would continue until the portfolio is completely invested in fixed income by age 85.

FIG. 19 illustrates the spending profile assuming equity markets are either flat or increase at an annual rate of 5%. In the current example, with flat equity markets, payouts grow at an annual rate of approximately 1.7%. By age 85, payouts have increased by 39% relative to the starting payout at age 65. If the stock market returns a modest 5% per annum, the growth rate of the payouts increases to 2.4% for a cumulative increase of 59%. While there is no guarantee that payouts will keep up with inflation, this approach to retirement investing gives participating investors an excellent chance for substantial payout growth during retirement.

While embodiments of the invention have been illustrated and described, it will be clear that the invention is not limited to such embodiments. For example, in order to facilitate a thorough understanding of embodiments of the present invention, various examples of detailed algorithms are provided; however, the exemplary algorithms are not intended to and should not be viewed as limiting the scope and/or applicability of the present invention. Numerous modifications, changes, variations, substitutions, and equivalents will be apparent to those skilled in the art, without departing from the spirit and scope of the invention, as described in the claims.

What is claimed is:

1. A computer-implemented method comprising:

based on information regarding (i) a total value of assets held in an investment plan of an investor, (ii) a desired retirement age of the investor and (iii) characteristics of a plurality of financial products within a limited universe of financial products available for investment within the investment plan, identifying, by one or more routines running on one or more computer systems, (a) a payout period over which a personalized pattern of periodic cash payouts are to be made to the investor from the investment plan and (b) the personalized pattern of periodic cash payouts that can be sustained throughout the payout period by implementing a payout program;

creating, by the one or more routines, a model of a plurality of fixed income investments selected from the limited universe of financial products as baskets of constant maturity Treasury bonds (CMTs);

optimizing, by the one or more routines, an allocation of at least a portion of the total value of the assets held within the investment plan among the plurality of fixed income investments based on the model, the payout period and the personalized pattern of periodic cash payouts;

creating, by the one or more routines, the payout program by causing the assets to be rebalanced among the plurality of financial products to form within the investment plan a payout portfolio and an equity exposure portfolio, wherein the payout portfolio is constructed to create a stream of income to support the personalized pattern of periodic cash payouts and includes an allocated portion of the total value among one or more of the plurality of fixed income investments based on results of said optimizing and wherein the equity exposure portfolio is constructed to address inflation risk by providing the investment plan with an ability to rise with equities markets; and causing, by the one or more routines, a periodic cash payout of the personalized pattern of periodic cash payouts to be paid to the investor.

2. The method of claim 1, wherein the personalized pattern of periodic cash payouts comprises a sustainable periodic cash payout that can last for the investor's lifetime based on the investor purchasing an annuity prior to age 85.

3. The method of claim 2, further comprising reserving sufficient funds to allow the investor to purchase the annuity by establishing a longevity reserve within the investment plan.

4. The method of claim 3, wherein the payout portfolio represents approximately 65% of the total value of assets held within the investment plan, the equity exposure portfolio represents approximately 20% of the total value of assets held within the investment plan and the longevity reserve represents approximately 15% of the total value of assets held within the investment plan.

5. The method of claim 1, further comprising responsive to growth of the non-payout portfolio, notifying the investor or a representative of the investor regarding an ability to increase the periodic cash payout.

6. The method of claim 1, wherein the investment plan comprises an employer-sponsored retirement plan.

7. The method of claim 6, wherein the employer-sponsored retirement plan comprises a 401(k) plan.

8. The method of claim 1, wherein the plurality of fixed income investments include one or more Treasury Inflation-Protected Securities.

9. The method of claim 1, wherein the equity exposure portfolio involves the use of leverage on stocks or stock funds.

10. The method of claim 1, wherein the personalized pattern of periodic cash payouts accommodates financial circumstances of the investor as a result of structuring a particular pattern of periodic cash payouts tailored for the investor that is based upon one or more factors outside of the investment plan.

11. The method of claim 1, wherein the one or more factors outside of the investment plan include Social Security, required minimum distributions, information regarding a corporate defined benefit plan, information regarding a lump sum distribution, information regarding a desired bequest or information regarding one or more other sources of income.

12. The method of claim 1, further comprising adjusting future periodic cash payouts of the personalized pattern of periodic cash payouts responsive to a request by or on behalf of the investor.

13. The method of claim 1, wherein the payout portfolio approximates risk and return properties of an ideal Treasury bond ladder.

14. A non-transitory computer-readable storage medium tangibly embodying a set of instructions, which when executed by one or more processors of one or more computer systems, cause the one or more processors to perform a method for creating flexible income, the method comprising:
based on information regarding (i) a total value of assets held in an investment plan of an investor, (ii) a desired retirement age of the investor and (iii) characteristics of a plurality of financial products within a limited universe of financial products available for investment within the investment plan, programmatically identifying (a) a payout period over which a personalized pattern of periodic cash payouts are to be made to the investor from the investment plan and (b) the personalized pattern of periodic cash payouts that can be sustained throughout the payout period by implementing a payout program;
programmatically creating a model of a plurality of fixed income investments selected from the limited universe of financial products as baskets of constant maturity Treasury bonds (CMTs);
programmatically optimizing an allocation of at least a portion of the total value of the assets held within the investment plan among the plurality of fixed income investments based on the model, the payout period and the personalized pattern of periodic cash payouts;
programmatically creating the payout program by causing the assets to be rebalanced among the plurality of financial products to form within the investment plan a payout portfolio and an equity exposure portfolio, wherein the payout portfolio is constructed to create a stream of income to support the personalized pattern of periodic cash payouts and includes an allocated portion of the total value among one or more of the plurality of fixed income investments based on results of said optimizing and wherein the equity exposure portfolio is constructed to address inflation risk by providing the investment plan with an ability to rise with equities markets; and
programmatically causing a periodic cash payout of the pattern of periodic cash payouts to be paid to the investor.

15. The computer-readable medium of claim 14, wherein the personalized pattern of periodic cash payouts comprises a sustainable periodic cash payout that can last for the investor's lifetime based on the investor purchasing an annuity prior to age 85.

16. The computer-readable medium of claim 15, wherein the method further comprises reserving sufficient funds to allow the investor to purchase the annuity by establishing a longevity reserve within the investment plan.

17. The computer-readable medium of claim 16, wherein the payout portfolio represents approximately 65% of the total value of assets held within the investment plan, the equity exposure portfolio represents approximately 20% of the total value of assets held within the investment plan and the longevity reserve represents approximately 15% of the total value of assets held within the investment plan.

18. The computer-readable medium of claim 14, wherein the method further comprises responsive to growth of the non-payout portfolio, programmatically causing the investor or a representative of the investor to be notified regarding an ability to increase the periodic cash payout.

19. The computer-readable medium of claim 14, wherein the investment plan comprises an employer-sponsored retirement plan.

20. The computer-readable medium of claim 19, wherein the employer-sponsored retirement plan comprises a 401(k) plan.

21. The computer-readable medium of claim 14, wherein the plurality of fixed income investments include one or more Treasury Inflation-Protected Securities.

22. The computer-readable medium of claim 14, wherein the equity exposure portfolio involves the use of leverage on stocks or stock funds.

23. The computer-readable medium of claim 14, wherein the personalized pattern of periodic cash payouts accommodates financial circumstances of the investor as a result of structuring a particular pattern of periodic cash payouts tailored for the investor that is based upon one or more factors outside of the investment plan.

24. The computer-readable medium of claim 14, wherein the one or more factors outside of the investment plan include Social Security, required minimum distributions, information regarding a corporate defined benefit plan, information regarding a lump sum distribution, information regarding a desired bequest or information regarding one or more other sources of income.

25. The computer-readable medium of claim 14, wherein the method further comprises programmatically adjusting future periodic cash payouts of the personalized pattern of periodic cash payouts responsive to a request by or on behalf of the investor.

26. The computer-readable medium of claim 14, wherein the payout portfolio approximates risk and return properties of an ideal Treasury bond ladder.

27. The method of claim 1, wherein the plurality of fixed income investments are limited to one or more of certificates of deposit, public corporate bonds, government bonds, public structured bonds, municipal bonds, bond mutual funds, corporate bond funds, stable-value funds and money market funds.

28. The computer-readable medium of claim 14, wherein the plurality of fixed income investments are limited to one or more of certificates of deposit, public corporate bonds, government bonds, public structured bonds, municipal bonds, bond mutual funds, corporate bond funds, stable-value funds and money market funds.

29. The method of claim 1, wherein said causing a periodic cash payout of the personalized pattern of periodic cash payouts to be paid to the investor comprises, sending distribution instructions to a recordkeeper of the investment plan.

30. The computer-readable medium of claim 14, wherein said programmatically causing a periodic cash payout of the personalized pattern of periodic cash payouts to be paid to the investor comprises, sending distribution instructions to a recordkeeper of the investment plan.

* * * * *